(12) United States Patent
Watanabe et al.

(10) Patent No.: US 8,174,943 B2
(45) Date of Patent: May 8, 2012

(54) OPTICAL DISK DEVICE

(75) Inventors: Katsuya Watanabe, Ehime (JP); Shinichi Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/739,973

(22) PCT Filed: Nov. 7, 2008

(86) PCT No.: PCT/JP2008/003237
§ 371 (c)(1),
(2), (4) Date: Apr. 27, 2010

(87) PCT Pub. No.: WO2009/063604
PCT Pub. Date: May 22, 2009

(65) Prior Publication Data
US 2010/0254231 A1    Oct. 7, 2010

(30) Foreign Application Priority Data

Nov. 12, 2007    (JP) .................................. 2007-292841

(51) Int. Cl.
*G11B 20/10*    (2006.01)
(52) U.S. Cl. ............... 369/47.14; 369/44.11; 369/53.15; 369/53.17; 369/53.2
(58) Field of Classification Search ............... 369/44.11, 369/47.14, 53.2, 53.15, 53.17
See application file for complete search history.

(56) References Cited

U.S. PATENT DOCUMENTS

| 4,789,974 | A | 12/1988 | Satoh et al. | |
| 2001/0055247 | A1* | 12/2001 | Tateishi et al. | 369/44.32 |
| 2007/0070850 | A1* | 3/2007 | Watanabe et al. | 369/53.22 |
| 2007/0253306 | A1 | 11/2007 | Takahashi et al. | |
| 2008/0130442 | A1* | 6/2008 | Kikugawa et al. | 369/53.13 |
| 2009/0059761 | A1 | 3/2009 | Watanabe et al. | |
| 2009/0073830 | A1* | 3/2009 | Shiraishi | 369/47.25 |
| 2010/0226226 | A1 | 9/2010 | Watanabe et al. | |

FOREIGN PATENT DOCUMENTS

| EP | 1 843 332 A1 | 10/2007 |
| JP | 63-083923 | 4/1988 |

(Continued)

OTHER PUBLICATIONS

Search Report for corresponding International Application No. PCT/JP2008/003237 mailed Feb. 3, 2009.

(Continued)

*Primary Examiner* — Wayne Young
*Assistant Examiner* — Brenda Bernardi
(74) *Attorney, Agent, or Firm* — Renner, Otto, Boisselle & Sklar, LLP

(57) ABSTRACT

An optical disc apparatus according to the present invention includes: a laser light source for emitting multiple light beams, of which the wavelengths are different from each other and include a first wavelength and a second wavelength that is longer than the first wavelength; an optical system for converging an arbitrarily selected one of the light beams on an optical disc that has a surface and at least one information storage layer; a focus control section for controlling the focus position of the light beam with respect to the optical disc; and a defect detecting section, which senses light reflected from the surface of the optical disc with the focus position of the light beam set on the surface, thereby determining, based on the intensity of the reflected light, whether or not there is a fingerprint on the optical disc.

10 Claims, 13 Drawing Sheets

FOREIGN PATENT DOCUMENTS

| | | |
|---|---|---|
| JP | 02-109240 U | 8/1990 |
| JP | 06-150575 | 5/1994 |
| JP | 07-147065 | 6/1995 |
| JP | 08-036846 | 2/1996 |
| JP | 09-055035 | 2/1997 |
| JP | 2000-222831 | 8/2000 |
| JP | 2002-093066 | 3/2002 |
| JP | 2002093066 A * | 3/2002 |
| JP | 2002-319135 | 10/2002 |
| JP | 2003-099923 | 4/2003 |
| JP | 2005-085406 | 3/2005 |
| JP | 2005085406 A * | 3/2005 |
| JP | 2006-179136 | 7/2006 |
| JP | 2007-122850 | 5/2007 |
| WO | 2006/038633 A1 | 4/2006 |
| WO | 2006/077916 A1 | 7/2006 |
| WO | 2008/041700 A1 | 4/2008 |

OTHER PUBLICATIONS

Form PCT/ISA/237 and partial English translation for International Application No. PCT/JP2008/003237 dated Feb. 3, 2009.

Co-pending U.S. Appl. No. 12/578,644 filed Oct. 14, 2009.

\* cited by examiner

OPTICAL DISK DEVICE

TECHNICAL FIELD

The present invention relates to an optical disc apparatus. More particularly, the present invention relates to an optical disc apparatus that can accurately locate a fingerprint on an optical disc by detecting a dot-to-dot gap of the fingerprint.

BACKGROUND ART

In optical disc technologies, data can be read out from a rotating optical disc by irradiating the disc with a relatively weak light beam with a constant intensity, and detecting the light that has been modulated by, and reflected from, the optical disc.

On a read-only optical disc, information is already stored as pits that are arranged spirally during the manufacturing process of the optical disc. On the other hand, on a rewritable optical disc, a recording material film, from/on which data can be read and written optically, is deposited by evaporation process, for example, on the surface of a substrate on which tracks with spiral lands or grooves are arranged. In writing data on a rewritable optical disc, data is written there by irradiating the optical disc with a light beam, of which the optical power has been changed according to the data to be written, and locally changing the property of the recording material film.

It should be noted that the depth of the pits, the depth of the tracks and the thickness of the recording material film are smaller than the material thickness of the optical disc. For that reason, those portions of the optical disc, where data is stored, define a two-dimensional plane, which is sometimes called a "storage plane" or an "information plane". However, considering that such a storage plane actually has a physical dimension in the depth direction, too, the term "storage plane (information plane)" will be replaced herein by another term "information layer". Every optical disc has at least one such information layer. Optionally, a single information layer may actually include a plurality of layers such as a phase-change material layer and a reflective layer.

To read data that is stored on an optical disc or to write data on a rewritable optical disc, the light beam always needs to maintain a predetermined converging state on a target track on an information layer. For that purpose, a "focus control" and a "tracking control" are required. The "focus control" means controlling the position of an objective lens perpendicularly to the information layer (which direction will be referred to herein as a "substrate depth direction") such that the focus position (or focal point) of the light beam is always located on the information layer. On the other hand, the "tracking control" means controlling the position of the objective lens along the radius of a given optical disc (which direction will be referred to herein as a "disc radial direction") such that the light beam spot is always located right on a target track.

To get the focus control and tracking control done, a focus error or a tracking error needs to be detected based on the light reflected from an optical disc and the location of the light beam spot needs to be adjusted so as to minimize the error. The magnitudes of the focus error and the tracking error are respectively represented by a "focus error (FE) signal" and a "tracking error (TE) signal" that are generated based on the light reflected from the optical disc.

Once a fingerprint is left on the surface of an optical disc, the intensity of the reflected light will decrease when the light beam passes through that fingerprint. As a result, the intensity distribution of the light beam will decrease non-uniformly, thus causing a disturbance in the TE signal and producing tracking abnormality. Consequently, some type of tracking failure such as a track jump happens. Various techniques have been proposed so far to avoid such tracking failures. For example, according to Patent Document No. 1, the decrease in the intensity of the reflected light is detected on a regular basis, and if any defect, including the presence of a fingerprint, has been detected, the user is notified of that, thereby avoiding predictable write failures. Meanwhile, if the user permits such a soiled disc, a read/write operation will be performed on it just as instructed by him or her. Furthermore, by providing means for avoiding a repetitive notification, an opportunity to perform a read/write operation just as planned can be guaranteed while avoiding write failures to be caused by the dirt on the disc.

Patent Document No. 1: Japanese Patent Application Laid-Open Publication No. 2006-179136

DISCLOSURE OF INVENTION

Problems to be Solved by the Invention

Various types of optical discs such as DVD (digital versatile disc)-ROM, DVD-RAM, DVD-RW, DVD-R, DVD+RW and DVD+R have become more and more popular these days as storage media on which a huge amount of information can be stored at a high density. Meanwhile, CDs (compact discs) are still popular now.

To increase the storage density of an optical disc, the light beam that has been converged on the data plane of an optical disc preferably has as small a spot size as possible. The spot size of a light beam is inversely proportional to the numerical aperture NA of an objective lens for use to converge the light beam. Thus, by increasing the numerical aperture NA of the objective lens, the spot size of the light beam can be decreased. Meanwhile, Blu-ray Disc (BD) and other next-generation optical discs that have even higher storage density and even bigger storage capacity than the optical discs mentioned above have become more and more popular nowadays. A BD requires a larger objective lens NA than a DVD's and covers the surface of its information layer with a thin light transmissive layer with a thickness of approximately 100 μm. That is why compared to a DVD, a BD is more sensitive to dust, fingerprints and other sorts of defects because the light beam converged on the information layer of a BD is affected (i.e., the intensity of its beam spot is decreased) by such defects much more significantly than on a DVD.

In the prior art, not just the fingerprints but also various other defects such as dirt, grazes, scratches and dust on an optical disc are detected by sensing a decrease in the amplitude of a reflected light intensity. That is to say, no matter what type of defect has been detected, the user is just notified of the presence of a defect on the disc. And he or she has no choice but to replace the disc with such a defect with another one.

However, in a situation where a scheduled recording operation is carried out while the user is away from home or after he or she has gone to bed at night with the recording schedule entered, even if the recorder tries to notify the user of the defect, he or she cannot replace the optical disc. In that case, the recorder cannot help either starting or continuing the write operation on the optical disc, in which the defect has been detected, at the expense of the quality of the data stored, or stopping the write operation with an error message displayed.

To overcome such a problem, the present inventors proposed an apparatus with the function of detecting a fingerprint on a BD and a mechanism for cleaning it in Japanese Patent Application No. 2007-223421. Specifically, with special attention paid to that fact that the beam spot on the surface of a BD has a size of about 0.15 mm, we designed an apparatus for detecting fingerprints by sensing the intensity of the reflected light drop discretely, which indicates that the beam passes through fingerprint dots.

Objective lenses for use in an optical disc apparatus to read/write from/to HD-DVDs and an optical disc apparatus to read/write from/to DVDs have numerical apertures (NAs) of 0.65 and 0.60, respectively, which are smaller than the setting for BDs. Also, an HD-DVD and a DVD both have a cover layer thickness of 0.6 mm, which is six times as large as that of a BD. As a result, the beam spot on the disc surface of an HD-DVD or a DVD has a size of at least 0.4 mm, and will have a lower intensity on average when passing through a fingerprint. Consequently, such an apparatus for use with an HD-DVD or a DVD cannot detect fingerprints separately from the other kinds of defects.

It is therefore an object of the present invention to provide a highly reliable optical disc apparatus that can sense the presence of a fingerprint on an HD-DVD or a DVD by accurately detecting fingerprint dots with a narrow converged beam spot while performing a focus servo operation on the disc surface of the HD-DVD or DVD.

Another object of the present invention is to provide a highly reliable optical disc apparatus that can detect fingerprints from not only BDs, HD-DVDs and DVDs but also even hybrid ones such as BD/DVDs and BD/HD-DVDs.

Means for Solving the Problems

An optical disc apparatus according to the present invention includes: a laser light source for emitting a light beam; an optical system for converging the light beam on an optical disc that has a surface and at least one information storage layer; a focus control section for controlling the focus position of the light beam with respect to the optical disc; and a defect detecting section, which senses light reflected from the surface of the optical disc with the focus position of the light beam set on the surface, thereby determining, based on the intensity of the reflected light, whether or not there is a fingerprint on the optical disc.

In one preferred embodiment, the laser light source emits multiple light beams, of which the wavelengths are different from each other and include a first wavelength and a second wavelength that is longer than the first wavelength. And the optical system converges an arbitrarily selected one of the multiple light beams onto the optical disc.

In another preferred embodiment, if the intensity of the reflected light has dropped a number of times, the defect detecting section presumes that the light should have passed through multiple dots that form the fingerprint and decides that there should be the fingerprint on the optical disc.

In still another preferred embodiment, the laser light source emits the light beam with the first wavelength when data is going to be read from, or written on, a BD disc, but emits the light beam with the second wavelength when data is going to be read from, or written on, a non-BD optical disc.

In yet another preferred embodiment, the optical disc apparatus includes disc type recognizing means for determining whether the optical disc loaded is a BD disc or a non-BD optical disc. If the disc type recognizing means has recognized the optical disc loaded to be a BD disc, the defect detecting section senses the light that has been reflected from the information storage layer of the optical disc with the focus position of the light beam set on the information storage layer of the optical disc, and determines, based on the intensity of the reflected light, whether or not there is a fingerprint on the optical disc.

In this particular preferred embodiment, when the disc type recognizing means is going to recognize the type of the optical disc loaded, the light source emits the light beam with the first wavelength earlier than any other one of the light beams, and the disc type recognizing means determines, based on the reflected light of the light beam with the first wavelength, whether the optical disc loaded is a BD or a non-BD optical disc.

In a specific preferred embodiment, if the optical disc loaded has been recognized to be a non-BD optical disc, the light source emits the light beam with the second wavelength among the multiple light beams, the focus control section sets the focus position of the light beam with the second wavelength on the surface of optical disc, and the defect detecting section senses the light that has been reflected from the surface of the optical disc with the focus position of the light beam set on the surface of the optical disc, and determines, based on the intensity of the reflected light, whether or not there is a fingerprint on the optical disc.

In yet another preferred embodiment, while the defect detecting section is detecting a fingerprint, the laser light source emits the light beam with the second wavelength and the focus control section sets the focus position of the light beam with the second wavelength on the surface of the optical disc.

In yet another preferred embodiment, the optical system includes an objective lens for BDs and another objective lens having a smaller numerical aperture NA than the objective lens for BDs. In setting the focus position of the light beam with the second wavelength on the surface of the optical disc, the focus control section uses a light beam that has passed through the objective lens having the smaller numerical aperture NA than the objective lens for BDs.

In yet another preferred embodiment, the defect detecting section determines, based on the intensity of the reflected light, whether the defect on the optical disc is a fingerprint or any other kind of defect.

In yet another preferred embodiment, the optical disc apparatus further includes a fingerprint wiping mechanism. If the defect detecting section has decided that there should be a fingerprint on the optical disc, the fingerprint wiping mechanism wipes the fingerprint away.

Effects of the Invention

An optical disc apparatus according to the present invention can sense the presence of a fingerprint on an optical disc by accurately detecting fingerprint dots with a narrow converged beam spot while performing a focus control operation on the disc surface.

In addition, an optical disc apparatus according to the present invention can also detect fingerprints from various types of optical discs including not only BDs, HD-DVDs and DVDs but also even hybrid ones such as BD/DVDs.

DESCRIPTION OF REFERENCE NUMERALS

Figure 1:
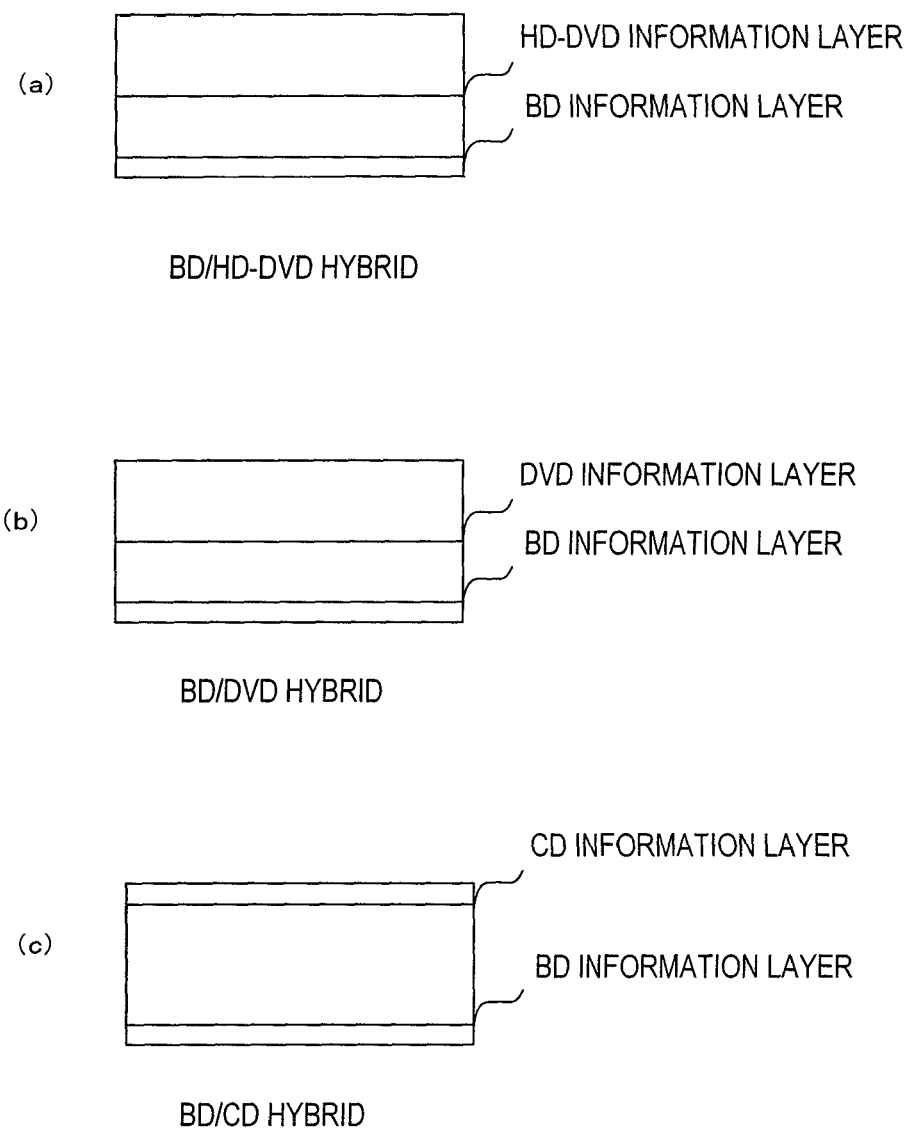
FIG. 1 is a cross-sectional view schematically illustrating the structures of hybrid optical discs including a BD layer.

103 optical pickup
106 servo controller
108 wiping brush
132 fingerprint processing section
301 focus control section
305 disc type recognizing section
308, 3081 fingerprint detecting section

BEST MODE FOR CARRYING OUT THE INVENTION

Principle of Surface Focus Fingerprint Detection

First of all, it will be described how in principle a fingerprint can be detected from an optical disc such a BD, an HD-DVD, a DVD or a CD. The following Table 1 summarizes the light transmissive layer thicknesses (corresponding to cover layer thicknesses, i.e., the distances from the surface of the optical discs to an information layer thereof) of the respective types of optical discs, NAs and the wavelengths of the light beam for use to read/write from/to those optical discs, the refractive indices of their cover layers, the angle of incidence of the light beam that has been converged by a lens, and the beam spot sizes dr and d (surface size) of the light beam on the information layer and at the surface of the optical disc, respectively, when the light beam is focused right on the information layer:

TABLE 1

| | BD | HD-DVD | DVD | CD |
|---|---|---|---|---|
| NA | 0.85 | 0.65 | 0.6 | 0.45 |
| Wavelength (nm) | 405 | 405 | 650 | 780 |
| Cover layer thickness (mm) | 0.1 | 0.6 | 0.6 | 1.2 |
| Refractive index | 1.5 | 1.5 | 1.5 | 1.5 |
| Angle of incidence (rad) | 0.60 | 0.45 | 0.41 | 0.30 |
| (deg) | 34.54 | 25.69 | 23.59 | 17.47 |
| Spot size (μm) | 0.286 | 0.374 | 0.650 | 1.040 |
| Surface size (μm) | 138 | 577 | 524 | 755 |

As can be seen from Table 1, the spot size dr on an information layer when the light beam is focused on the information layer is defined by the limit of diffraction of the light that has been transmitted through the objective lens. Specifically, the spot size dr can always be calculated as $dr=0.6\lambda/NA$ using the wavelength $\lambda$ and NA for any of these various types of optical discs. On the other hand, the spot size dh at the disc surface when the light beam is focused on the information layer is determined by NA and the light transmissive layer thickness D. That spot size dh can be calculated by the following equations:

$$NA = \sin\theta = n \times \sin\gamma \text{ and}$$

$$dh = 2D \times \tan\gamma$$

where $\theta$ represents the angle of incidence of the light beam that has passed through the lens and n represents the refractive index of the light transmissive layer.

Next, look at FIGS. 1(a) to 1(c), which illustrate the respective cross-sectional structures of a BD/HD-DVD hybrid optical disc, a BD/DVD hybrid optical disc, and a BD/CD hybrid optical disc. The fingerprint detection technique of the present invention can naturally be used in not just such hybrid optical discs but also any other normal optical disc as well. However, the principle of fingerprint detection according to the present invention will be described as being applied to a hybrid optical disc to make the reader understand more easily how that technique works.

It should be noted that when any of these optical discs shown in FIGS. 1(a) to 1(c) is loaded into an optical disc apparatus, an optical pickup will be located under the optical disc. Thus, a light beam will be incident on an information layer of that optical disc from under the disc and through the surface of the disc.

Figure 2:
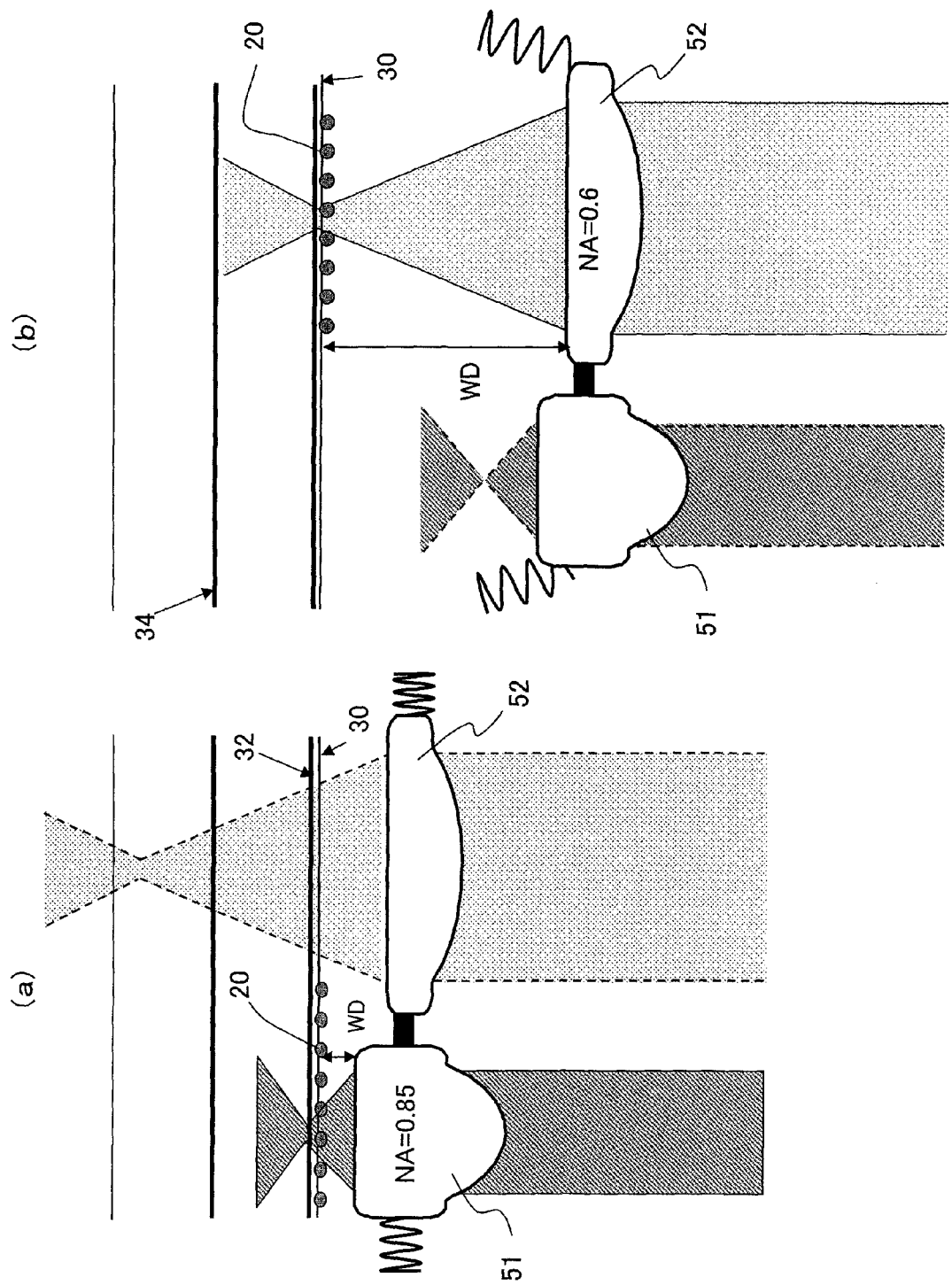
FIG. 2 is a schematic representation illustrating where on a BD/DVD hybrid optical disc a light beam is focused with respect to a fingerprint.

Next, look at FIGS. 2(a) and 2(b). Specifically, FIG. 2(a) is a cross-sectional view schematically illustrating how an optical pickup with a BD lens 51 and a DVD lens 52 focuses a light beam to read/write from/to BDs (which will be referred to herein as a "BD light beam") on a BD information layer 32 of a BD/DVD hybrid optical disc. On the other hand, FIG. 2(b) is a cross-sectional view schematically illustrating how the optical pickup with the BD lens 51 and the DVD lens focuses a light beam to read/write from/to DVDs (which will be referred to herein as a "DVD light beam") on the "disc surface" of the BD/DVD hybrid optical disc.

In FIGS. 2(a) and 2(b), WD stands for a working distance, which is the distance from the upper surface of the objective lens 51 or 52 to the surface 30 of the optical disc. In reading or writing data from/on the BD information layer 32, the WD is adjusted to be approximately 0.3 mm. On the other hand, in focusing the light beam on the disc surface, the WD is adjusted to be approximately 1.6 mm. In the optical disc shown in FIGS. 2(a) and 2(b), multiple fingerprint dots 20 are left on the surface 30 thereof.

When the BD light beam is focused on the BD information layer 32, the beam spot has a surface size dh of 138 μm (=0.138 mm). On the other hand, when the DVD light beam is focused on the disc surface, the beam spot has a surface size dh of 0.650 µm. As can be seen, even if the DVD light beam is focused on the surface of an optical disc, the light beam spot formed on the "optical disc surface" has a very small diameter.

Figure 3:
FIG. 3 is a micrograph showing an actual fingerprint left on a disc surface to illustrate a principle of fingerprint detection on a BD.

FIG. 3 is a micrograph of a fingerprint, which was left on the surface of an optical disc and in which the white dots represent fingerprint dots. Specific shape of a fingerprint varies between individuals according to their sex and age. In general, however, each dot 20 of a fingerprint normally has a diameter of approximately 80 µm or less and a dot-to-dot gap (also called a "dot pitch") has a length of approximately 0.30 mm on average.

Figure 4:
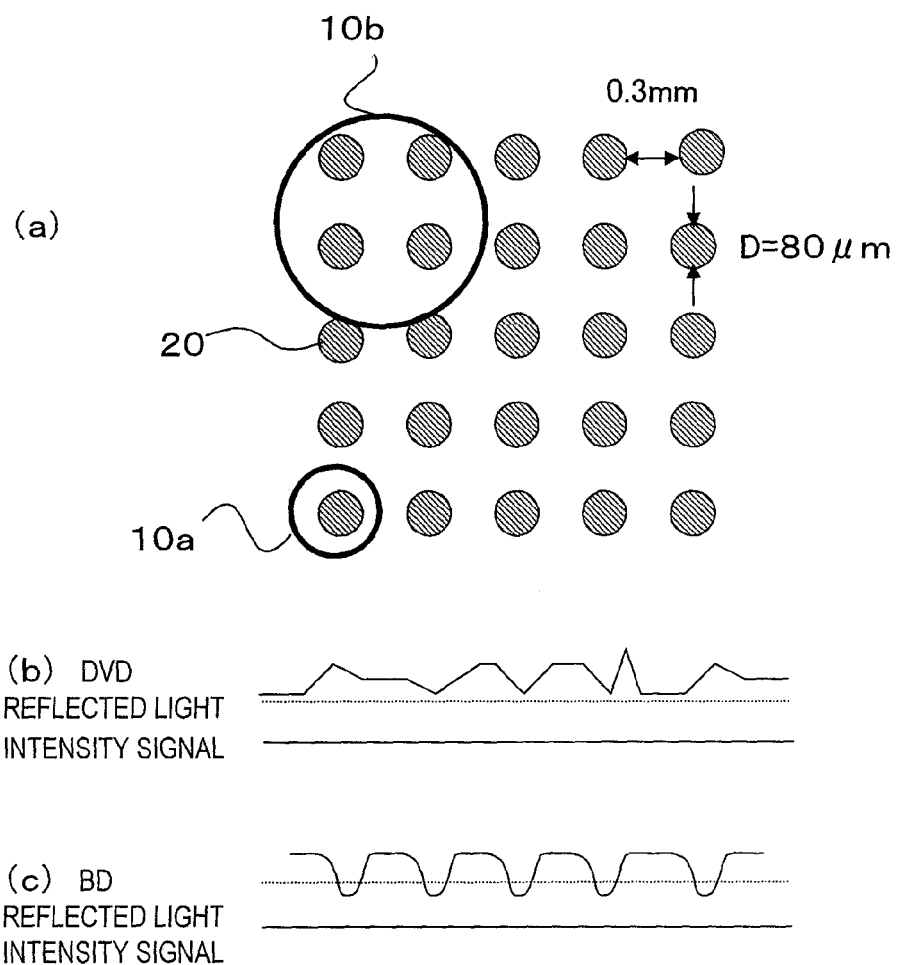
FIG. 4 is a schematic representation showing the locations of light beam spots with respect to simulated fingerprint dots to illustrate a principle of fingerprint detection on a BD.

Portion (a) of FIG. 4 is a plan view schematically illustrating a BD light beam spot 10a, a DVD light beam spot 10b, and fingerprint dots 20. Portion (b) of FIG. 4 shows the waveform of a reflected light intensity when the DVD light beam spot 10b passes through the fingerprint dots 20. And portion (c) of FIG. 4 shows a reflected light intensity signal when the BD light beam spot 10a passes through the fingerprint dots 20.

As used herein, the "reflected light intensity signal" refers to a signal representing the intensity of the light reflected from an optical disc. If recording pits or recording marks have already been formed on an information layer of the optical disc, then the "reflected light intensity signal" is an "RF signal" that has been modulated by the recording pits or recording marks. On the other hand, if no recording pits or recording marks have been left yet on any information layer of an optical disc, then the "reflected light intensity signal" is a non-modulated direct current signal with Hi level.

The spot size dh on the surface of the optical disc when the light beam is focused on the BD information layer 32 is 0.138 mm, which is even smaller than the dot-to-dot pitch shown in portion (a) of FIG. 4. That is why the passage of the BD light beam through one fingerprint dot 20 after another can be easily detected by sensing an increase or a decrease in reflected light intensity (see portion (c) of FIG. 4).

On the other hand, when focused on an "information layer", the light beam has a spot size of 0.577 mm on the surface of an HD-DVD and a spot size of 0.524 mm on the surface of a DVD. These beam spots are bigger than the fingerprint dots. For that reason, as HD-DVDs and DVDs, even if the light beam focused on the information layer passes through one fingerprint dot on the optical disc surface after another, the increase or decrease in the reflected light intensity representing the intensity of the reflected light is too small to detect the fingerprint dots 20 easily (see portion (b) of FIG. 4).

However, even if the light beam is focused on the information layer of an HD-DVD or that of a DVD, the spot sizes dr on the HD-DVDs information layer and on the DVD information layer are 0.37 µm and 0.65 µm, respectively, which are far smaller than the fingerprint dot pitch. That is why if the focus servo operation is performed so that the focus position of the light beam is adjusted onto the optical disc surface, not on the information layer, a fingerprint can still be detected from even an HD-DVD or a DVD, theoretically speaking.

Figure 5:
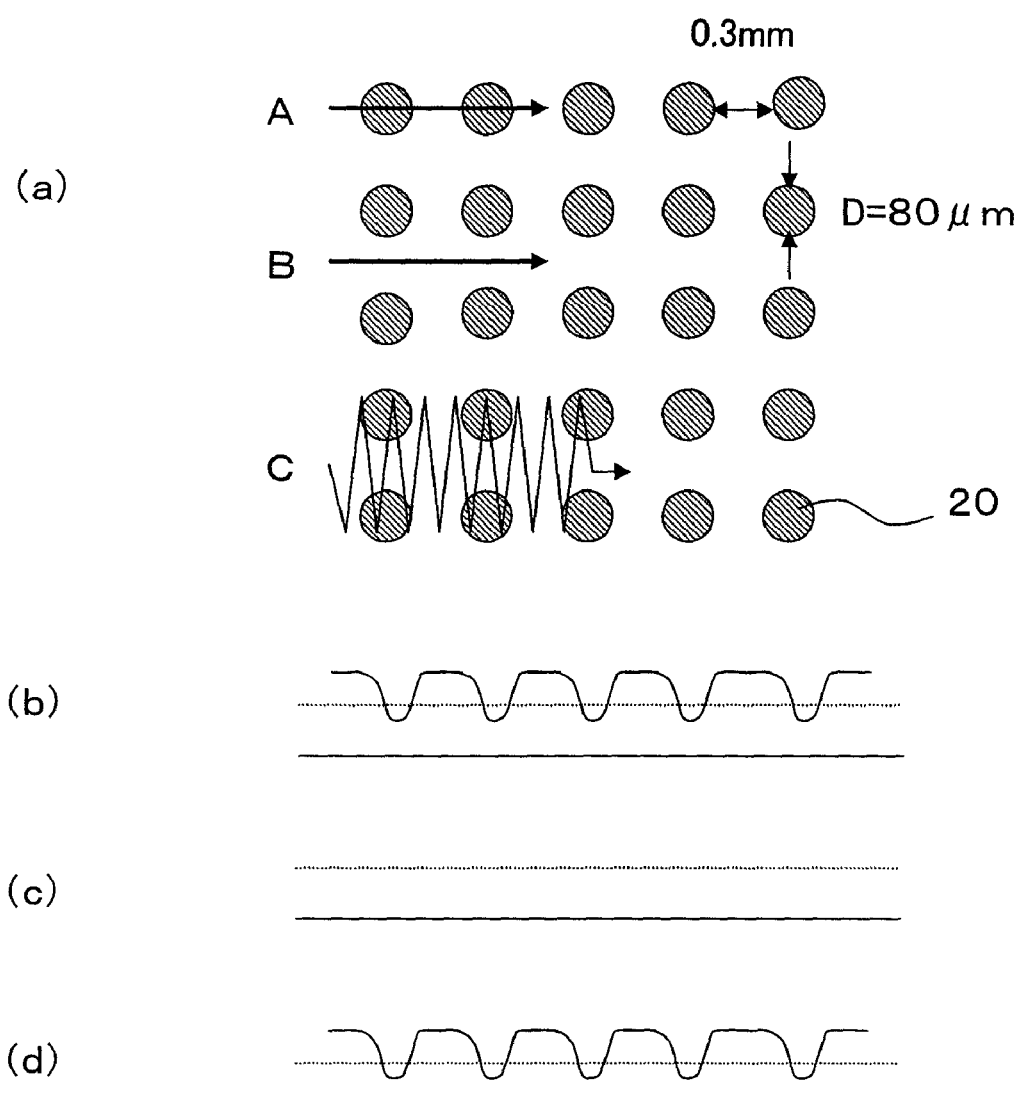
FIG. 5 is a schematic representation showing the locations of light beam spots with respect to simulated fingerprint dots to illustrate a principle of fingerprint detection in a situation where the light beam is focused on the disc surface.

FIG. 5 illustrates how a spot of the light beam that has been focused on the disc surface of an HD-DVD or a DVD goes through fingerprint dots. In a situation indicated by the arrow A shown in FIG. 5, the light beam spot is much smaller than, and will get buried in, the dots. That is why in a range where the light beam is passing through the fingerprint dots, the intensity of the reflected light decreases. In that case, by getting the reflected light intensity signal on hold and by measuring the amount of time and the number of times of that hold, the fingerprint can be distinguished from the other kinds of defects. For example, a fingerprint dot size of 80 µm and a dot pitch of 300 µm are much bigger than an HD-DVD spot size of 0.37 µm and a DVD spot size of 0.65 µm. Therefore, while the light beam being focused on the disc surface is going through a fingerprint, the totally reflected light intensity signal will alternately have a low amplitude level of 80 µm and a high amplitude level of 300 µm. For instance, supposing the optical disc is rotating at a velocity of 3,000 rpm=50 rps (i.e., in 1/50 seconds per revolution) as measured at a radial location of 25 mm, it will take the following amounts of time:

50 mm×3.14×50=7.85 m/S 0.08/7.85×1,000=10 µs 0.30/7.85×1,000=38 µs

In that case, the signal representing the reflected light intensity will be a signal that alternates between the two levels every 10 µs and every 38 µs, and therefore, can be monitored easily even with a DSP or a timer, for example.

As described above, by adjusting the focus position of a light beam to the surface of an optical disc, not to an information layer located inside of the optical disc, the light beam spot can be converged, on the disc surface with a fingerprint, narrow enough to detect the fingerprint easily.

As shown in Table 1, even for a beam spot formed on a CD, its surface size dh when the light beam is focused on the disc surface of the CD can be as small as about 1 µm. That is why if the light beam is focused on the disc surface, not on the information layer, the fingerprint can be detected without depending on the thickness of the light transmissive layer of the optical disc, the NA of the objective lens or the laser wavelength. It will be described later what the arrows B and C shown in FIG. 5 mean.

Hereinafter, it will be described with reference to FIG. 6 basically how the optical disc apparatus of the present invention operates.

In a preferred embodiment of the present invention, first of all, the optical disc apparatus determines whether the optical disc loaded into it is a BD or a non-BD optical disc. Such disc type recognition can get done by using a light source and an optical system for BDs.

Specifically, after the optical disc apparatus has been loaded with an optical disc, first, a blue (or blue-violet) semiconductor laser diode, which is a light source for use with a BD, is driven in Step ST100, thereby getting a blue light beam emitted from the semiconductor laser diode.

Next, in Step ST102, it is determined whether the optical disc loaded is a BD or not. This type recognition processing step will be described in detail later. If the given optical disc has turned out to be a BD as a result of the type recognition processing step, the process advances to Step ST104, in which the blue light beam is focused on the BD information layer, thereby performing a defect search.

On the other hand, if the optical disc loaded has turned out to be non-BD optical disc in Step ST102, then the light sources are changed into a red semiconductor laser diode, for example, in Step ST106 and a red light beam gets emitted from that semiconductor laser diode. On that optical disc, a defect search will be carried out by focusing the light beam on the "surface" of that optical disc, not on the information layer, in Step ST108.

Figure 6:
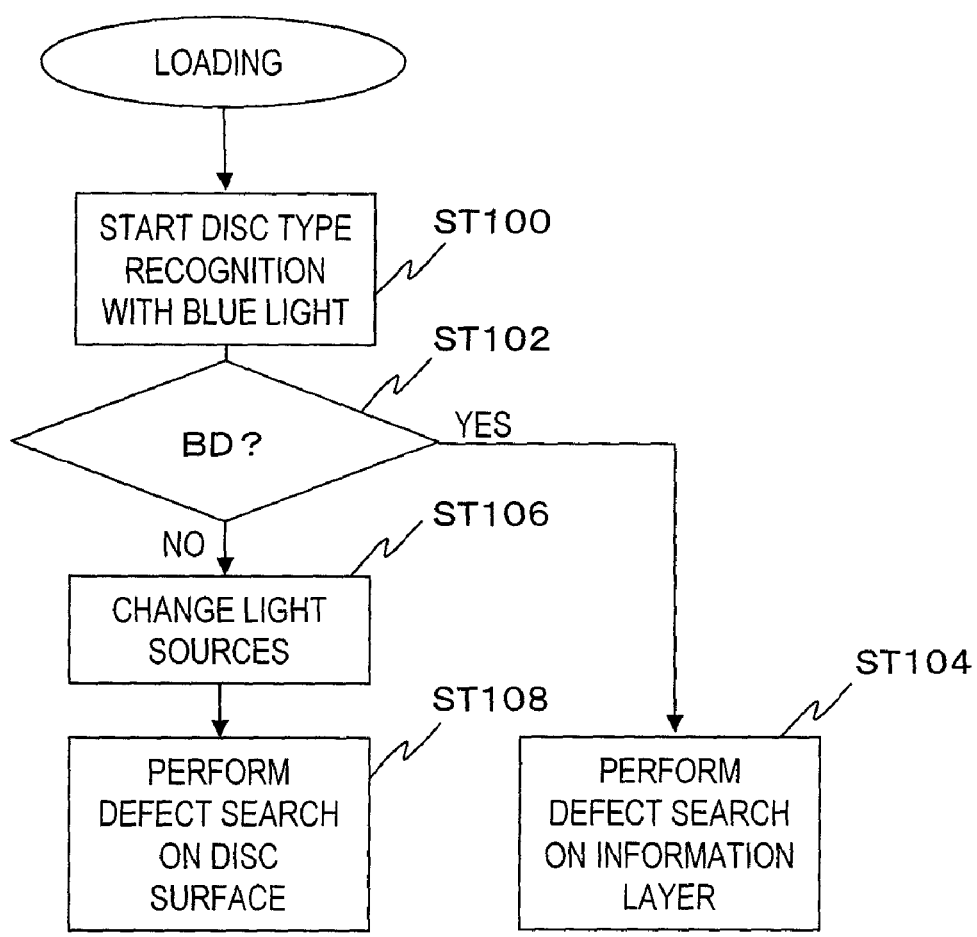
FIG. 6 is a flowchart showing basically how the optical disc apparatus of the present invention operates.

In the example illustrated in FIG. 6, the disc type recognition process gets started by irradiating the given optical disc with a blue light beam first. However, the disc type recognition process may also be performed with a light beam in any other color. For example, the disc type recognition process may also be carried out using a DVD optical system (i.e., a red laser diode and an objective lens with an NA of 0.6). In that case, if the optical disc loaded has turned out to be a DVD as a result of the disc type recognition process, a defect search will be performed with the red laser beam focused on the surface of the given optical disc as it is.

Alternatively, if a disc type recognition process gets started using a CD optical system and an infrared beam, then a defect search may be carried out with the infrared beam focused on the disc surface after the disc type recognition process gets done.

Embodiment 1

Hereinafter, a first specific preferred embodiment of an optical disc apparatus according to the present invention will be described.

According to this preferred embodiment, the disc type recognizing section of the optical disc apparatus determines whether the given optical disc is a BD or a non-BD optical disc such as an HD-DVD or a DVD, and the methods of detecting a fingerprint are changed based on the result of the disc type recognition.

As described above, since a BD has a light transmissive layer with as small a thickness as 0.1 mm, its surface spot size is as small as 0.138 mm even when the light beam is focused normally on its information layer. That is why fingerprint dots with a pitch of 0.3 mm can be detected easily from a BD. Also, a BD optical system has a very high NA of 0.85. That is why if the light beam was focused on the optical disc surface, the focus error signal would get much less stabilized due to non-uniformity in the thickness of the light transmissive layer and unevenness caused by the fingerprint dots themselves. For that reason, it is very difficult to establish a focus control on the surface of a BD with good stability. On the other hand, an optical system for use with an HD-DVD or a DVD has a relatively small NA of 0.65 or 0.6. Therefore, the influence of spherical aberration on such a non-BD optical disc due to non-uniformity in the thickness of its light transmissive layer will be approximately one-tenth compared to a BD. Consequently, a focus control can get established with good stability on the surface of such an optical disc.

Furthermore, as for a BD, when the light beam is focused on its information layer, its WD (working distance) is as small as 0.3 mm or less. That is why even if the light beam could be focused on the surface of that optical disc in one way or another, the WD would be increased by only 0.1 mm and would still be just about 0.4 mm. For that reason, if the focus control failed due to some impact caused by vibration, the lens would collide against the optical disc to get the optical disc scratched. As for a DVD and an HD-DVD, on the other hand, their WD is as long as 0.6-1.0 mm in the first place. In addition, if the light beam is focused on the surface of such an optical disc, their WD will be further increased by 0.6 mm, and therefore, the combined WD can be 1.0 mm or more eventually. For that reason, even if the focus control failed due to some impact caused by vibration, the collision can not only be prevented relatively easily mechanically but also be detected readily electrically (or systematically).

For these reasons, according to this preferred embodiment, a fingerprint left on a BD is detected with the light beam focused on its information layer but a fingerprint left on an HD-DVD or a DVD is detected with the light beam focused on the surface of that optical disc.

Hereinafter, the configuration of an optical disc apparatus according to this preferred embodiment will be described with reference to FIG. 7.

Figure 7:
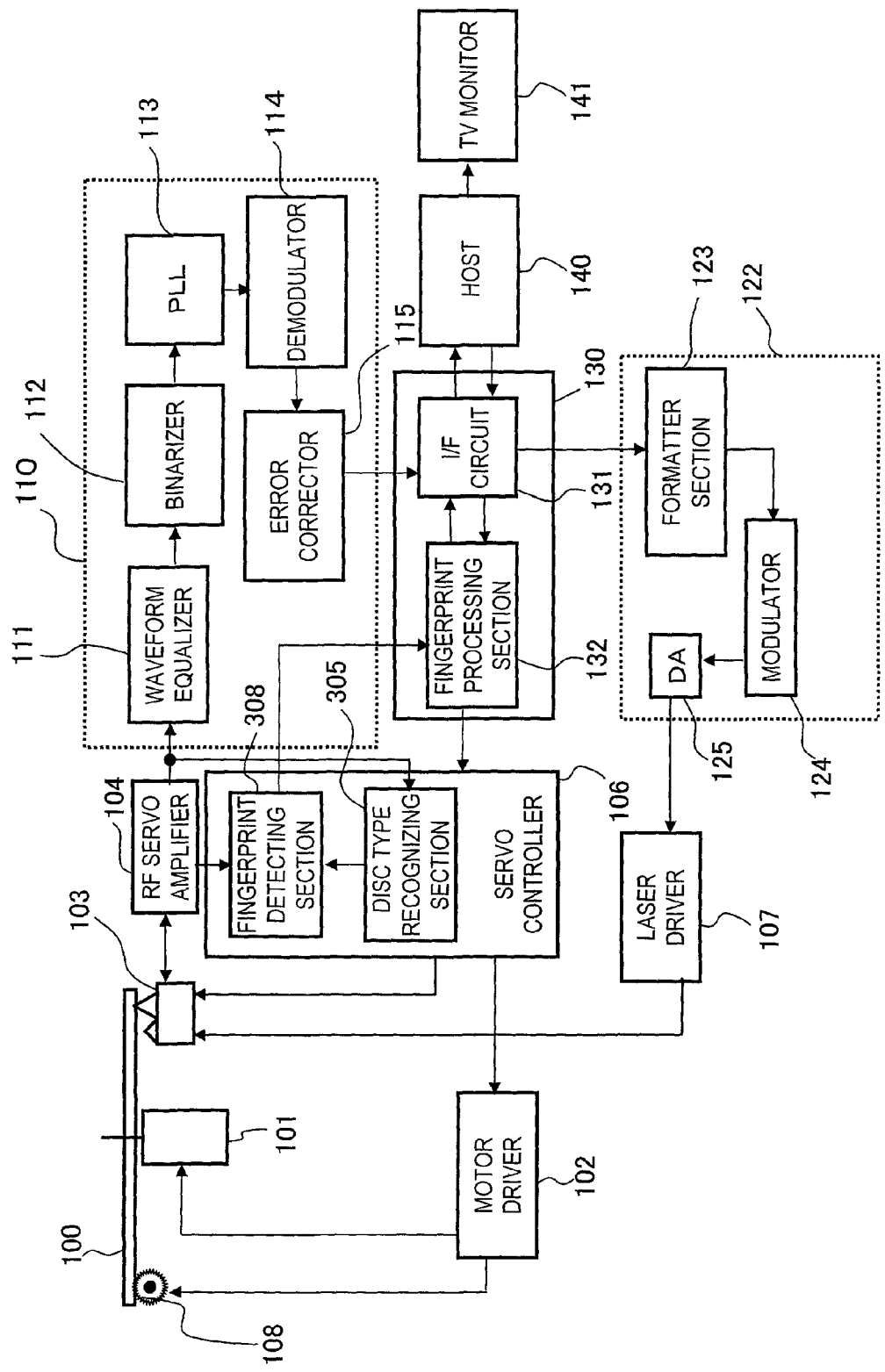
FIG. 7 illustrates the arrangement of functional blocks in the optical disc apparatus of the present invention.

FIG. 7 is a block diagram illustrating a configuration for the optical disc apparatus. The optical pickup 103 includes two objective lenses with an NA of 0.6 to 0.65 and with an NA of 0.85 and two laser light sources with wavelengths of 650 nm and 405 nm, respectively.

The optical disc apparatus of this preferred embodiment includes the optical pickup 103, a servo controller 106 for controlling the operation of the optical pickup 103, a read circuit 110 for performing read signal processing on an information signal that has been detected from the optical disc 100 by the optical pickup 103, and a write circuit 122 for writing information to store on the optical disc 100 by activating the laser diode by a predetermined modulating technique and making the laser diode generate a pulsed laser beam representing the information to be written and stored.

Specifically, the optical pickup 103 irradiates the optical disc 100, which has been mounted on an optical disc motor 101, with a converged laser beam. An RF servo amplifier 104 generates an electrical signal based on the light that has been reflected from the optical disc 100. The servo controller 106 performs a focus control and a tracking control on the optical disc 100 that has been mounted on the optical disc motor 101.

In the read circuit 110, a waveform equalizer 111 equalizes the electrical signal supplied from the RF servo amplifier 104, thereby generating an analog read signal, which is then binarized by a binarizer 112. The binary signal thus obtained is synchronized with a read clock signal (functioning as a reference clock signal) by a PLL circuit 113, thereby extracting data. Thereafter, a demodulator 114 and an error corrector 115 make an error correction on every predetermined number of blocks of that data. Then, the signal thus obtained is output from the read circuit 110 to a system controller 130, which includes an I/F circuit 131 and a fingerprint processing section 132. The signal that has been entered into the system controller 130 from the read circuit 110 is also transferred to a host 140 by way of the I/F circuit 131.

The write circuit 122 includes a formatter section 123 that adds a header and redundancy bits for the purpose of error correction, a modulator 124 for modulating the signal into a predetermined modulation pattern (or by a predetermined modulating method), and a D/A converter 125 for converting the digital signal into an analog signal to be input to a laser driver 107. To write the information that has been provided from the host 140 by way of the I/F circuit 131 on the optical disc 100, the write circuit 122 activates the laser diode (not shown) in the optical pickup 103 and makes it produce a pulsed laser beam. As the laser beam impinging on the optical disc 100 varies its intensities, the reflectances of the recording material (such as an organic material or a phase change material) of the optical disc 100 are changed, thereby writing information as ones or zeros.

Figure 8:
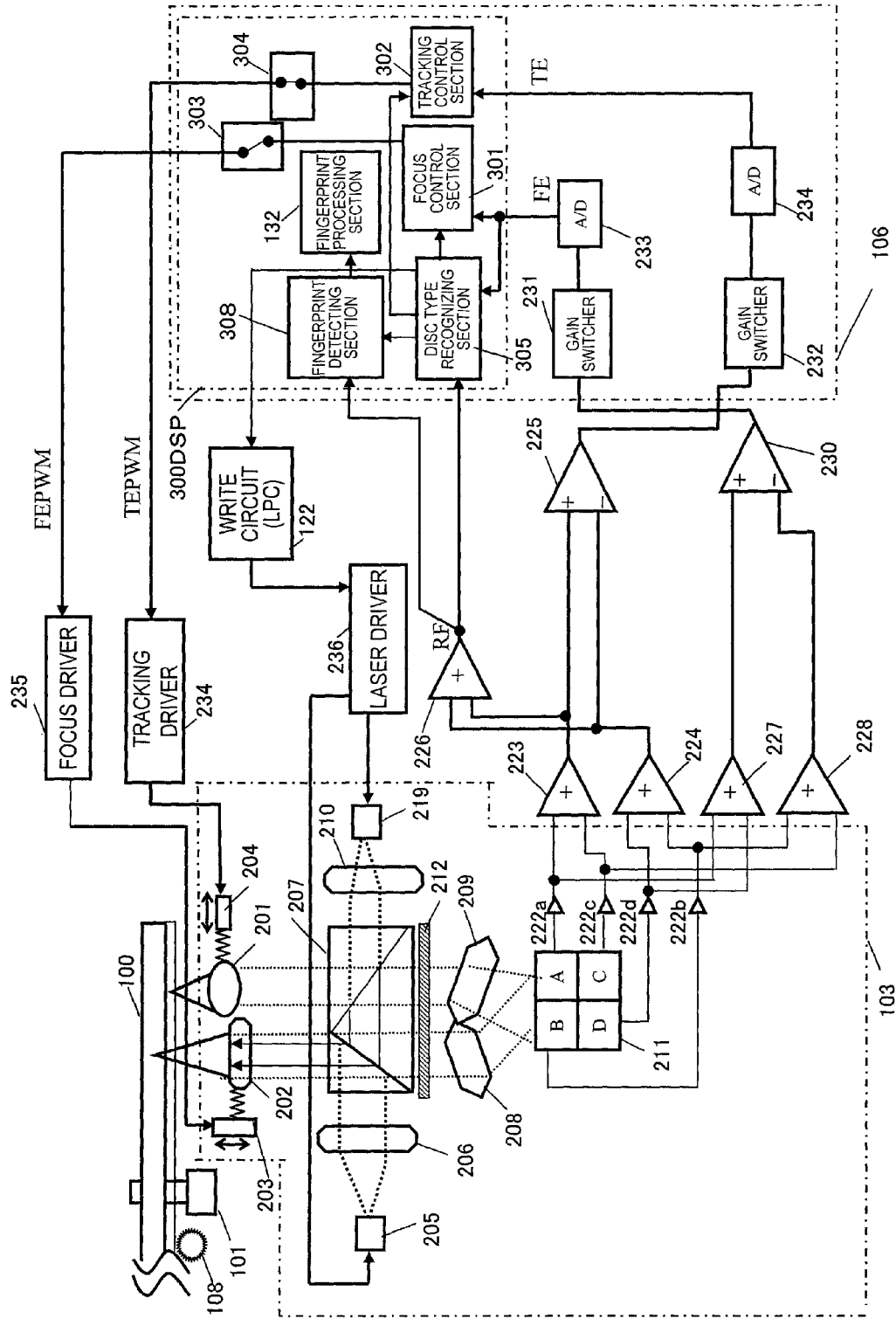
FIG. 8 illustrates a more detailed arrangement of functional blocks in the optical disc apparatus of the present invention.

FIG. 8 illustrates a more detailed configuration for the servo controller 106, the optical pickup 103 and their surrounding sections in the optical disc apparatus shown in FIG. 7. Hereinafter, the configuration will be described in detail with reference to FIG. 8.

The optical pickup 103 includes an objective lens 201 with an NA of 0.85 for use to read/write from/on BDs and another objective lens 202 with an NA of 0.6 to 0.65 for use to read/write from/on HD-DVDs and DVDs. Those two objective lenses are driven by a focus actuator 203 and a tracking actuator 204 that form a pair.

If the optical disc loaded is a BD, the light beam enters the objective lens 201 by way of a blue-violet laser diode 219, a collimator lens 210, and a polarization beam splitter 207 and then irradiates the optical disc 100. On the other hand, if the optical disc loaded is an HD-DVD, for example, the light beam enters the objective lens 202 by way of the blue-violet laser diode 219, the collimator lens 210, and the polarization beam splitter 207 and then irradiates the optical disc 100. And if the optical disc loaded is a DVD, the light beam enters the objective lens 202 by way of a red laser diode 205, a collimator lens 206, and the polarization beam splitter 207 and then irradiates the optical disc 100.

The light reflected from the optical disc 100 is transmitted through the polarization beam splitter 207, converged to a predetermined spot size either by a detector lens 209 as for a BD or by a detector lens 208 as for an HD-DVD or a DVD, and then incident on a quadruple detector 211. The electrical signals supplied from the A, B, C and D areas of the quadruple detector 211 are amplified by preamplifiers 222a, 222b, 222c and 222d, respectively. Then, adders 223, 224 and a differential amplifier 225 generate a tracking error signal (TE), adders 223, 224 and 226 generate an RF signal, and adders 227, 228 and a differential amplifier 230 generate a focus error signal (FE).

In accordance with an instruction given by a DSP (digital signal processor) 300, the FE and TE signals are supplied through gain switchers 231, 232 and A/D converters 233, 234 to the DSP 300. The gain switchers 231 and 232 can adjust or change the gains in a predetermined pattern as the reflectance of the optical disc 100 or the recording or reading power of the laser diode 205, 219 vary. The input FE signal is subjected to low range compensation and phase compensation through digital computations by a focus control section 301 consisting of a delay element, an amplifier and an adder, subjected to PWM (pulse width modulation) by way of a selector switch 303 and then output to a focus driver 235, which drives the focus actuator 203 with the current amplified, thereby performing a control so that the light beam has a predetermined converged state.

The TE signal that has been input at the same time is subjected to low range compensation and phase compensation through digital computations by a tracking control section 302 consisting of a delay element, an amplifier and an adder, subjected to PWM by way of a switch 304 that turns ON and OFF the tracking control system, and then output to a tracking driver 234, which drives the tracking actuator 204 with the current amplified, thereby performing a control so that the scanning light beam goes right along the target track.

The signal generated by the adders 223, 224 and 226 (which will be referred to herein as a "reflected light intensity signal") is supplied to a disc type recognizing section 305 and a fingerprint detecting section 306. The FE signal, which is an output signal of the A/D converter 233, is also supplied to the disc type recognizing section 305.

The disc type recognizing section 305 recognizes the type of the optical disc loaded to be either a BD or a non-BD optical disc (such as an HD-DVD or a DVD), determines whether or not anything has been written on the information layer and outputs results of these decisions as a control signal to the fingerprint detecting section 308.

If the disc type recognizing section 305 has recognized the optical disc loaded to be a BD and sensed that data has been written on the optical disc, then the section 305 lets the focus control section 301 and the tracking control section 302 continue a focus control and a tracking control, respectively, on the information layer. Then, after the spherical aberration and other parameters have been adjusted to that information layer, the fingerprint detecting section 308 determines, by the level of the reflected light intensity signal (or an envelope detection signal obtained by removing high frequency components from an RF signal if data has already been written on the optical disc), whether the intensity of the reflected light is high or low when a fingerprint is passed (i.e., whether the amplitude of the signal has increased or decreased) and then measures that intensity. In this manner, the fingerprint detecting section 308 detects the fingerprint separately from the other kinds of defects.

If the disc type recognizing section 305 has recognized the optical disc loaded to be a BD and sensed that no data has been written on the optical disc yet or if it has recognized the optical disc loaded to be an HD-DVD or a DVD, then the section 305 instructs the focus control section 301 to set a target of the focus control on the surface of the optical disc, not on the information layer. In that case, since the light beam is focused on the disc surface with a cover layer thickness of 0 mm, instead of the information layer with a cover layer thickness of 0.6 mm, the collimator lens 212 is preferably driven on the optical axis so that the spherical aberration value agrees with the one on the disc surface. Alternatively, the spherical aberration value may also be adjusted to the value on the disc surface by using a liquid crystal material, which has been divided to have an aberration canceling pattern, instead of the collimator lens 212 and by changing the polarization directions of the liquid crystal material so as to optimize the aberration.

As described above, on recognizing the optical disc loaded to be a non-BD optical disc such as an HD-DVD or a DVD, the optical disc apparatus of this preferred embodiment detects accurately fingerprint dots with a narrow converged spot, which has been formed by performing a focus control right on the surface of the optical disc, thereby distinguishing the fingerprint from the other kinds of defects.

Next, a preferred method of recognizing the type of a given optical disc will be described.

In this preferred embodiment, first of all, the type of the given optical disc is recognized using a short-wave (preferably blue) light beam. After the startup process (or the disc loading process) has finished and before the operation of recognizing the type of that optical disc gets done, the optical disc apparatus of this preferred embodiment gets a light beam with the shortest wavelength, which is used to read/write data from/to one of multiple candidate types of optical discs, emitted from the light source. In a preferred embodiment, those multiple candidate types of optical discs are optical discs that were manufactured compliant with a BD standard and various other standards for DVDs and CDs, for example. Among those various types of optical discs, that particular type of optical discs, from/to which data is read or written using a light beam with the shortest wavelength, are BDs. That is why a blue light beam is emitted from a blue light source.

Next, before a focus control or a tracking control is started, the operation of recognizing the type of the given optical disc using the light beam that has been reflected from the optical disc is started. Specifically, the level of the focus error signal is monitored with the objective lens moved perpendicularly to the optical disc, thereby counting the number of S-curves. And it can be determined, by the number of those S-curves, whether the given optical disc is a BD or not. The reason is that an optical system for BDs has a high numerical aperture NA and requires a short distance between the objective lens and the point of convergence of the light beam. That is why if only one S-curve, except the one representing the disc surface, has appeared on the focus error signal as the objective lens moves in the axial direction (i.e., within a predetermined range), then the given optical disc can be recognized as a single-layer BD with only one information layer. On the other hand, if two S-curves have appeared there, then the given optical disc can be recognized to be a dual-layer BD with two information layers. This is because in an optical system for use to read/write from/to a BD, the distance from the objective lens to the point of convergence of the light beam (i.e., the focal length) is too short for the point of convergence of the blue light beam to reach the information layer a DVD or a CD. That is to say, if the optical disc loaded is a DVD or a CD, no S-curves should appear on the focus error signal.

As can be seen, by using a blue light beam, the type of the given optical disc can be recognized more accurately than a situation where a red or infrared light beam is used. In addition, even though a blue light beam with high energy is used, neither a focus control nor a tracking control has been started yet, and therefore, chances of inducing some deterioration with the read beam are very slim, too.

After that, while the light beam spot on the optical disc is moving on the optical disc at a linear velocity that is equal to or higher than a standard velocity, the focus control gets started. Under the focus control, the operation of recognizing the type of the given optical disc using the light beam that has been reflected from the optical disc is carried out. Specifically, a tracking error signal is generated from the optical disc, and it can be determined, by the amplitude of that tracking error signal, whether the light that is irradiating the given optical disc now is what should be used for that optical disc.

For example, if the given optical disc is not a BD while the focus control operation is being performed on that optical disc with a blue light beam converged on its information layer, then no tracking error signal with sufficient amplitude can be obtained, and therefore, the given optical disc is recognized to be a non-BD optical disc. Conversely, if the amplitude of the tracking error signal has reached a predetermined level or more, then the optical disc loaded can be recognized as a BD.

Figure 9:
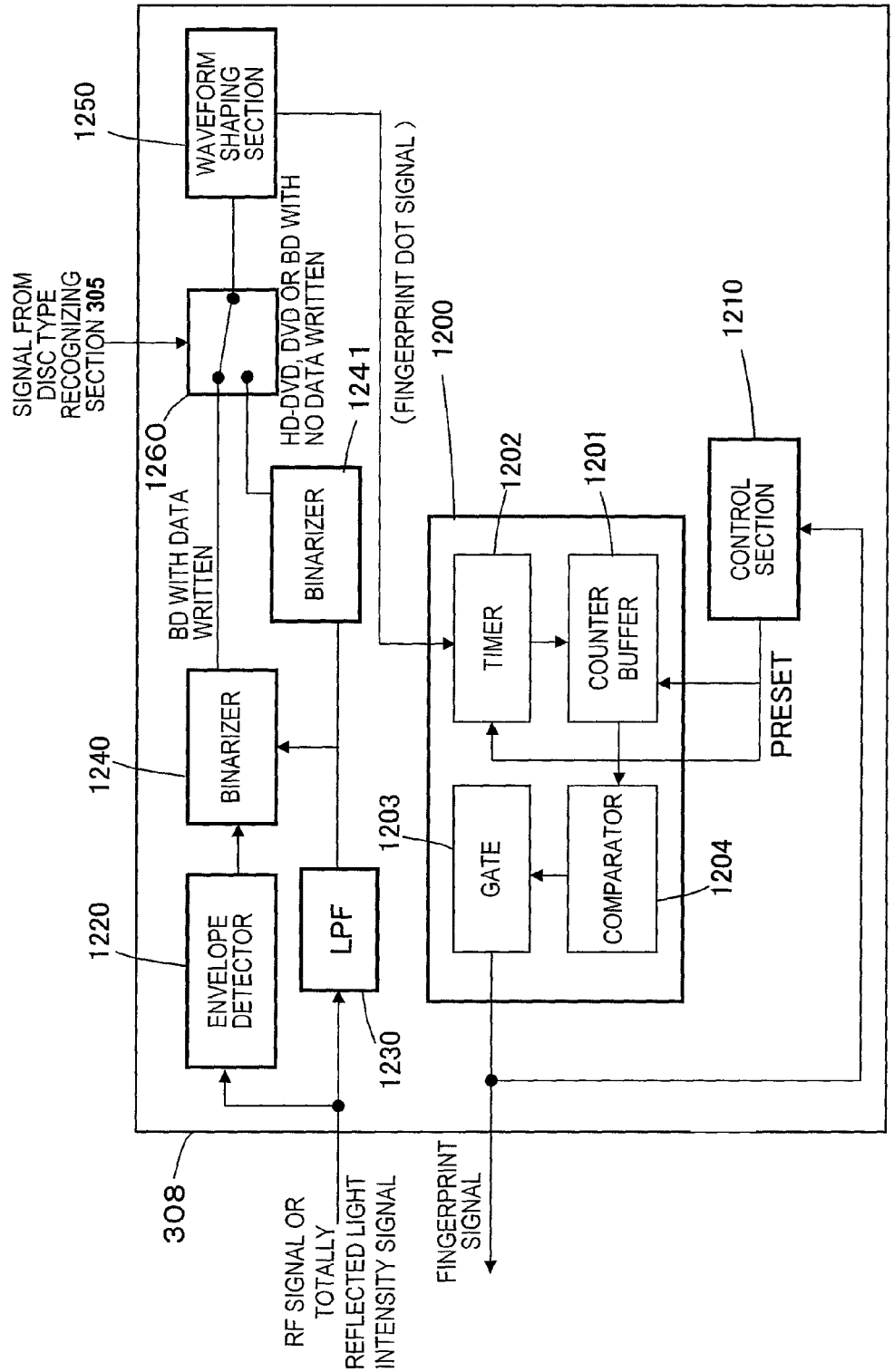
FIG. 9 is a block diagram illustrating the configuration of the fingerprint detecting section shown in FIG. 7.

Hereinafter, a configuration for focusing a light beam on the information layer (if the given optical disc has turned out to be BD) or on the surface of the optical disc (if the given optical disc has turned out to be a non-BD optical disc such as a DVD or an HD-DVD) and then performing a fingerprint detection will be described. FIG. 9 is a block diagram illustrating a detailed configuration for the fingerprint detecting section 308.

First, suppose an RF signal is input to the fingerprint detecting section 308. The RF signal supplied from the RF servo amplifier 104 shown in FIG. 7 is input to an LPF 1230 and an envelope detector 1220 in the fingerprint detecting section 308. The outputs of the envelope detector 1220 and the LPF 1230 are both entered into a binarizer 1240.

The binarizer 1240 slices off the output signal of the envelope detector 1220 with the level of the output signal of the LPF 1230 defined as a reference level for binarization (i.e., as a slice level). As a result, a binarized signal is input to a selector switch 1260. On the other hand, if the totally reflected light intensity signal is input to the fingerprint detecting section 308, then the LPF 1230 outputs a reflected light intensity signal representing the intensity of the light reflected from the optical disc. And that signal is directly input to another binarizer 1241, which also slices off the reflected light intensity signal with respect to the predetermined reference level and supplies the binarized signal thus obtained to the selector switch 1260. In accordance with the control signal supplied from the disc type recognizing section 305, the selector switch 1260 turns its contact to upside if the given optical disc has been recognized to be a BD on which data has already been written but turns its contact to downside if the given optical disc has been recognized to be a BD on which no data has been written yet or if the given optical disc has turned out to be an HD-DVD or a DVD on which the light beam needs to be focused on its surface. The output of the selector switch 1260 is a binarized signal representing fingerprint dots and dot-to-dot intervals (which will be referred to herein as a "fingerprint dot signal").

This preferred embodiment is a hybrid-disc-compatible optical disc apparatus that can read and write from/to both BDs and non-BD optical discs such as HD-DVDs. However, if the present invention is implemented as a BD player for playing only BDs, the selector switch 1260 is fixed to the upside. On the other hand, if the present invention is implemented as a universal recorder with the ability to perform a write operation on any of BDs, HD-DVDs and DVDs, then the selector switch 1260 may be fixed to the downside.

The fingerprint dot signal has its waveform shaped by a waveform shaping section 1250 and then has its pulse widths (at Hi level) and pulse intervals (at Low level) measured by a timer 1202 in a fingerprint measuring section 1200. The fingerprint dot signal has a pulse train representing the respective dots that form the fingerprint. That is why by measuring the pulse widths and pulse intervals, the fingerprint can be distinguished from the other kinds of defects. In the fingerprint measuring section 1200, the timer 1202 measures the widths of the respective pulses (at High level) included in the fingerprint dot signal and the intervals (at Low level) between those pulses.

If the measured values fall within the range of predetermined pulse widths representing fingerprint dots and within the range of predetermined intervals representing dot-to-dot gaps, the number of the fingerprint dots is stored in a counter buffer 1201. If the light beam is going to pass through a number of fingerprint dots, the number of dots is incremented by one every time the light beam passes through one of the fingerprint dots. That is why if the defect that the light beam is now passing is a fingerprint, at least a predetermined number of dots are detected continuously. The count (i.e., the output signal) of the counter buffer 1201 is compared to a predetermined value by a comparator 1204. If the count of the counter buffer 1201 is equal to or greater than the predetermined value, a gate circuit 1203 is notified of the result of the comparison made by the comparator 1204. Based on the output of the comparator 1204, the gate circuit 1203 generates a signal indicating whether the defect detected is a fingerprint or not (which will be referred to herein as a "fingerprint signal"). Then, the fingerprint signal is fed back from the gate circuit 1203 to a control section 1210. In response to this feedback, the timer 1202 and the counter buffer 1201 are preset. Also, while getting ready to enter the next fingerprint detecting state, the fingerprint detector 308 outputs the fingerprint signal to the fingerprint processing section 132 in the system controller 130.

A steep drop of the amplitude of a reflected light intensity signal due to presence of dust or a scratch is called "black dropout (BDO)". Thus, defects caused by dust or a scratch (i.e., defects other than fingerprints) will sometimes be referred to herein as "BDO", too. If the light beam passes an area that would produce a BDO (which will be referred to herein as a "BDO area"), then the binarizer 1240 outputs only a single-pulse signal with a long pulse width. As a result, the gate is kept "L" due to the restriction on the width represented by a timer value and on the count of the counter buffer. Since the control section 1210 presets the timer 1202 and the counter buffer 1201 in such a state, no fingerprint signal is output if the light beam has passed the BDO area.

Figure 10:
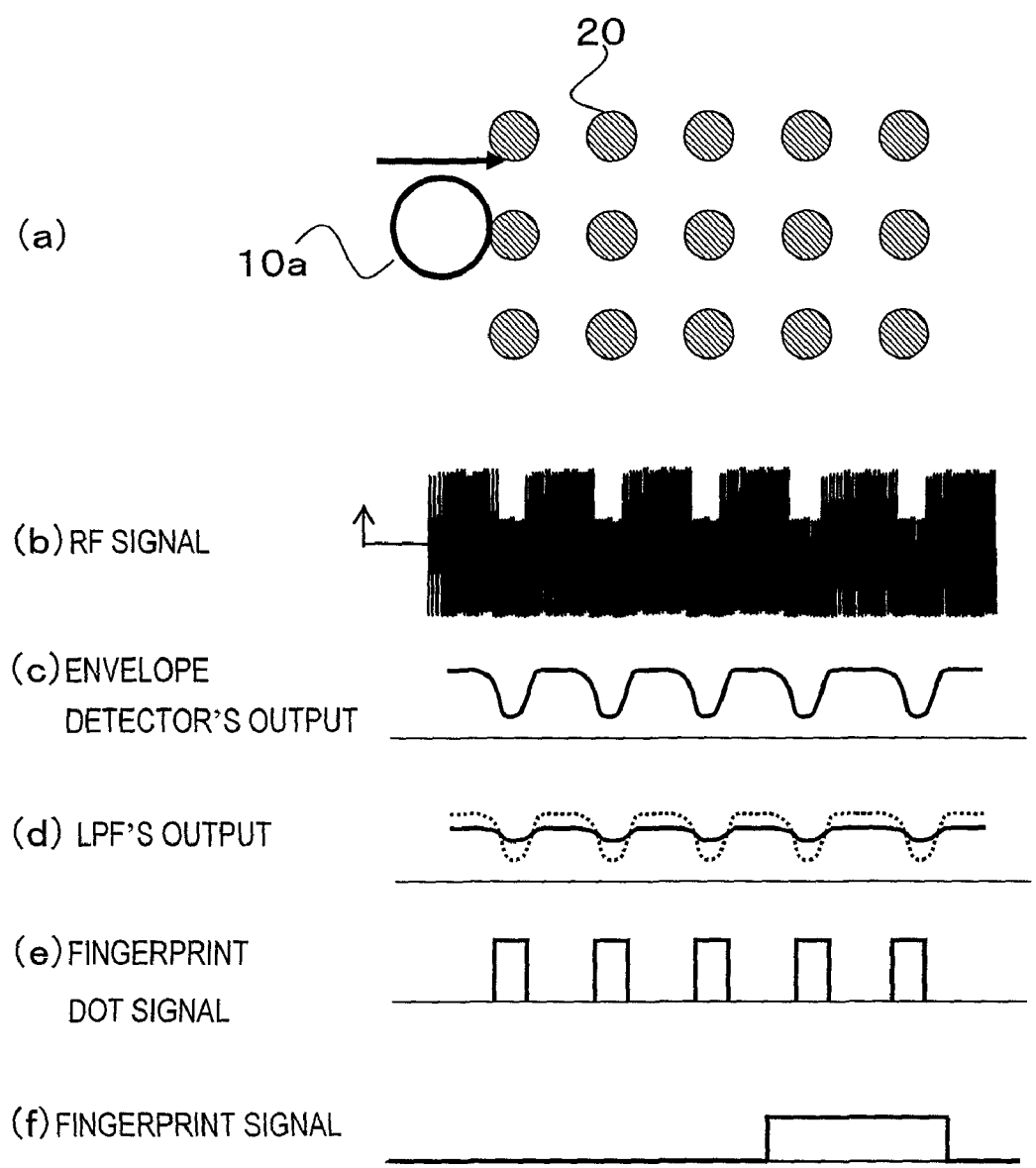
FIG. 10 shows the waveforms of signals for use in the respective sections to illustrate the fingerprint detection operation shown in FIG. 8.

Portion (a) of FIG. 10 is a plan view schematically illustrating a light beam spot 10a and fingerprint dots 20. Portion (b) of FIG. 10 shows the waveform of the output of the RF servo amplifier 104 (i.e., an RF signal) when the light beam spot 10a passes through the fingerprint dots 20. The RF signal shown in portion (b) of FIG. 10 has high frequency components representing variations in reflectance caused by recording pits or recording marks. Specifically, when the light beam passes through the fingerprint dots 20, the upper envelope of the RF signal comes to have decreased amplitude. It should be noted that if no data has been written yet on the information layer of the optical disc, then the reflected light intensity signal has no high frequency components representing recording pits or recording marks and has its amplitude decreased at the fingerprint dots. Portion (c) of FIG. 10 shows the output of the envelope detector 1220. Portion (d) of FIG. 10 shows the output of the LPF 1230. Portion (e) of FIG. 10 shows the waveform of the signal that has been binarized and has its waveform shaped by the binarizer 1240 (i.e., the fingerprint dot signal). And portion (f) of FIG. 10 shows the waveform of the fingerprint signal that is the output of the gate circuit 1203.

Figure 11:
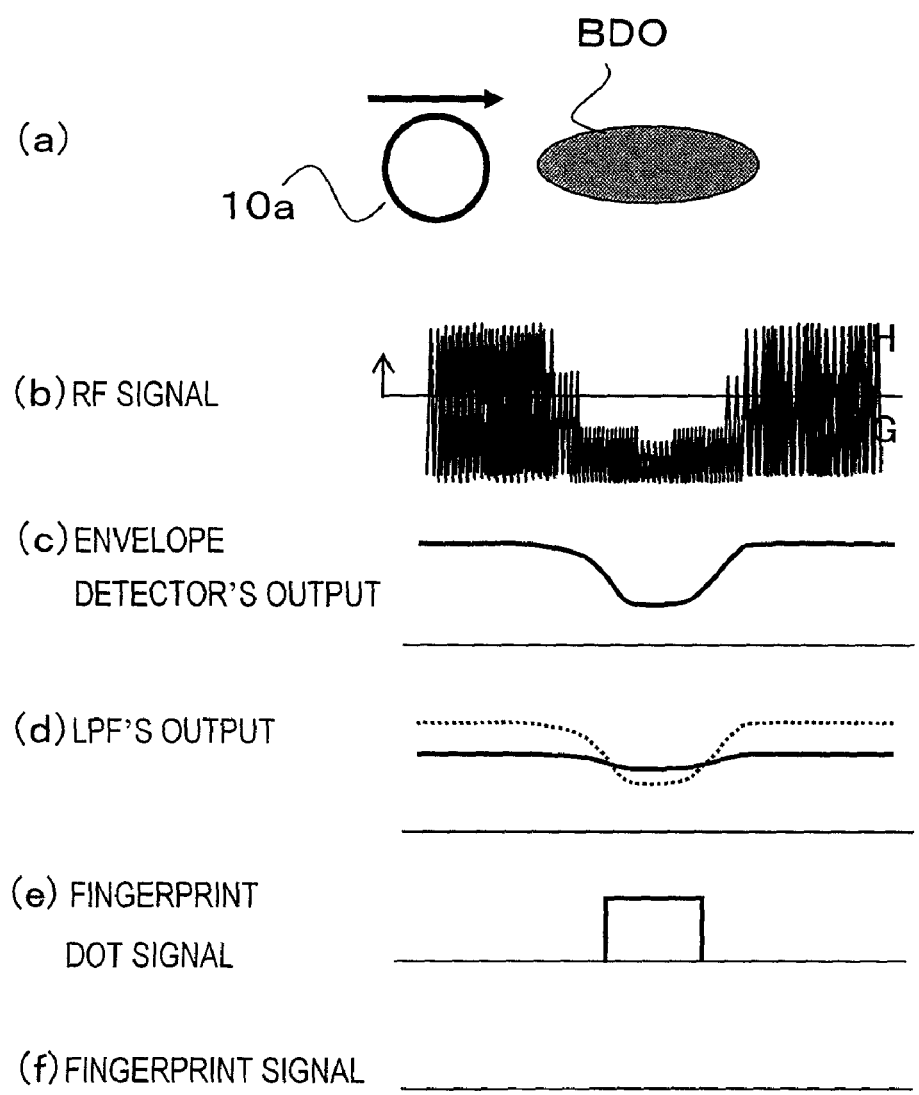
FIG. 11 shows the waveforms of signals for use in the respective sections to illustrate the fingerprint detection operation shown in FIG. 8.

On the other hand, portion (a) of FIG. 11 is a plan view, schematically illustrating a light beam spot 10a and a BDO area. Portion (b) of FIG. 11 shows the waveform of the output of the RF servo amplifier 104 (i.e., an RF signal) when the light beam spot 10a passes the BDO area. Portion (c) of FIG. 11 shows the output of the envelope detector 1220. Portion (d) of FIG. 11 shows the output of the LPF 1230. Portion (e) of FIG. 11 shows the waveform of the signal that has been binarized and has its waveform shaped by the binarizer 1240 (i.e., the fingerprint dot signal). And portion (f) of FIG. 11 shows the waveform of the fingerprint signal that is the output of the gate circuit 1203.

As described above, the diameter of the light beam spot 10a on a BD is approximately one fifth to a quarter as large as that of the light beam spot on a DVD, and is close to the sizes of the fingerprint dots 20 or the dot-to-dot gap. That is why when the light beam spot 10a passes through a fingerprint, the amplitude of the RF signal representing the reflected light varies as shown in portion (b) of FIG. 10 in a situation where the RF signal is input to the fingerprint detecting section 308. The amplitude of the RF signal decreases because the intensity of the reflected light decreases when the light beam spot 10a passes through each of the fingerprint dots that form the fingerprint. On the other hand, if the light beam spot 10b has a large diameter as in a DVD, multiple fingerprint dots are always included in the single light beam spot 10b. That is why the decrease in the amplitude of the RF signal (or totally reflected light intensity signal) in response to the passage of the light beam spot through each fingerprint dot as shown in portion (b) of FIG. 10 cannot be detected from a DVD.

Portion (d) of FIG. 10 shows the output of the LPF after the signal shown in portion (b) of FIG. 10 has gone through the LPF 1230. If the output of the envelope detector 1220 is binarized by the binarizer 1240 by comparing its levels to the reference detection level that is defined by this LPF output, a fingerprint dot signal having a waveform representing the fingerprint dots can be obtained as shown in portion (e) of FIG. 10.

On the other hand, if the totally reflected light intensity signal is input to the fingerprint detecting section 308, portion (d) of FIG. 10 shows the output of the LPF after the reflected light intensity signal has gone through the LPF 1230. If this LPF output is sliced off with respect to a predetermined reference level and binarized by the binarizer 1241, a fingerprint dot signal having a waveform representing the fingerprint dots can be obtained as shown in portion (e) of FIG. 10.

If the timer 1202 has found the fingerprint dot signal have a predetermined pulse width (which will be referred to herein as "H width") and a predetermined pulse interval (which will be referred to herein as "L width"), then the fingerprint dot signal is stored in the counter buffer 1201. If the comparator 1204 has found the pulse widths of the fingerprint dot signal equal to or greater than a predetermined value a prescribed number of times (e.g., three times) consecutively, then the gate circuit 1203 generates and outputs a fingerprint signal as shown in portion (f) of FIG. 10. Also, if the timer 1202 has found the interval between the pulses of the fingerprint dot signal (i.e., the "L width") greater than t3, then the fingerprint signal is changed from H level into L level.

On the other hand, since a BDO area is bigger than a fingerprint dot, the amplitude of the RF signal continues to drop for a relatively long time as shown in portion (b) of FIG. 11. When such an RF signal goes through the LPF 1230, the LPF output shown in portion (d) of FIG. 11 is obtained.

If the output of the envelope detector shown in portion (c) of FIG. 11 is binarized by the binarizer 1240, then a fingerprint dot signal, having a waveform representing the magnitude of the BDO, can be obtained as shown in portion (e) of FIG. 11. The pulse width (i.e., "H width") of this fingerprint dot signal is measured by the timer 1202. In this case, since the pulse width fails to satisfy t1<H width<t2, the count of the counter buffer 1201 is not incremented. As a result, no fingerprint signal is output in this case as shown in portion (f) of FIG. 11.

Figure 12:
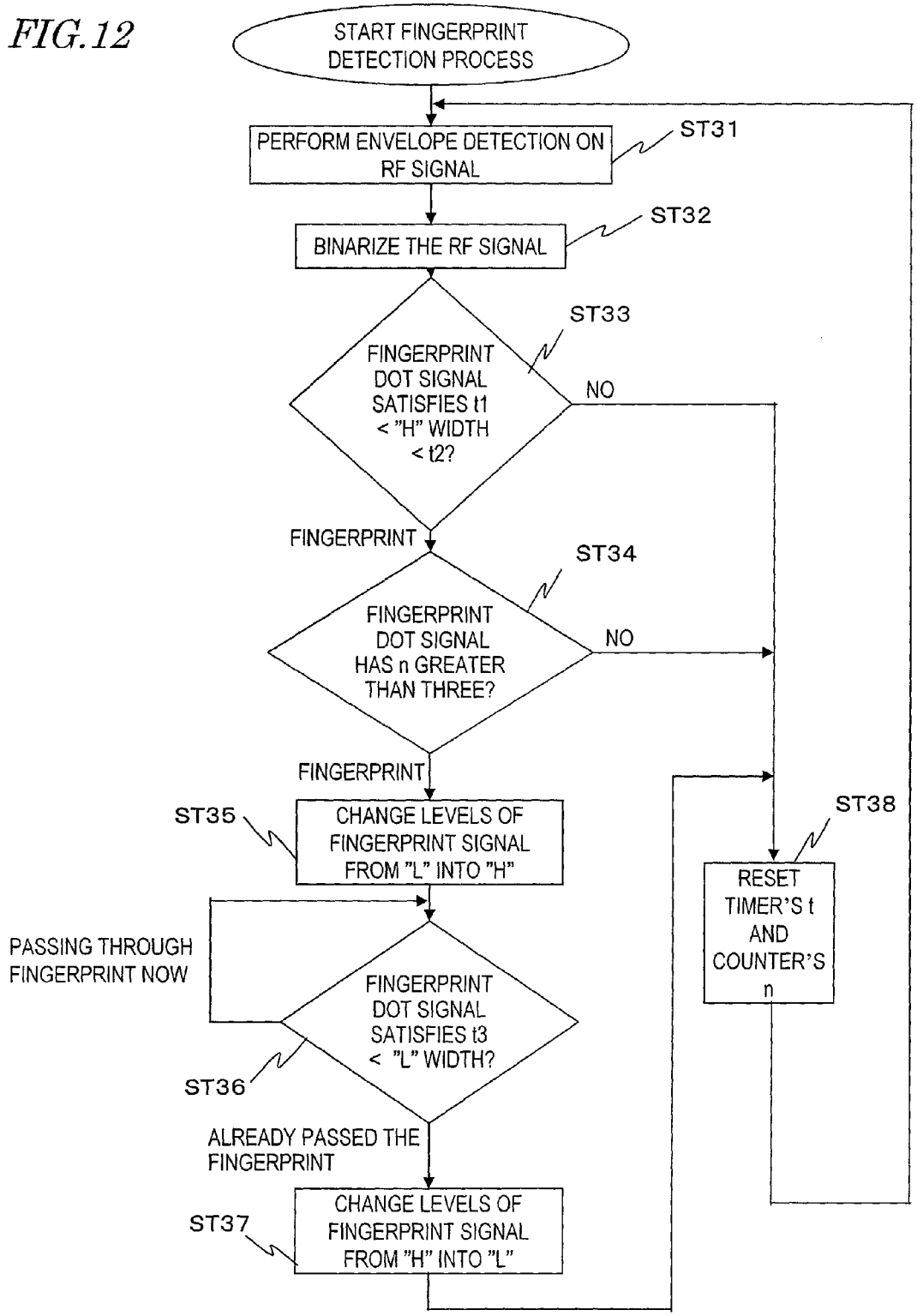
FIG. 12 is a flowchart showing the procedure of the fingerprint detection processing shown in FIG. 8.

Hereinafter, an exemplary fingerprint detection flow will be described with reference to FIG. 12.

First, in Step ST31, envelope detection is performed on an RF signal. Next, in Step ST32, the RF signal is binarized, thereby generating a fingerprint dot signal.

Subsequently, in Step ST33, it is determined whether or not the width (H width) of pulses included in the fingerprint dot signal falls within a predetermined range. If the answer is NO, the defect turns out to a non-fingerprint defect and the process advances to Step ST38, in which the timer and the counter are reset to get ready for the next defect detection.

If the pulse widths (H widths) have turned out in Step ST33 to fall within the predetermined range, then it is determined in the next step ST34 whether or not the number n of pulses that form the pulse train representing fingerprint dots is more than three. If the answer is NO, then the defect is found to be a non-fingerprint defect and the process advances to Step ST38. On the other hand, if n is greater than three, then the defect turns out to be a fingerprint and the process advances to Step ST35, in which the levels of the fingerprint signal are changed from L into H.

Next, in Step ST36, it is determined whether or not the pulse-to-pulse interval of the fingerprint dot signal is longer than a predetermined period t3. If the answer is NO, then the light beam is determined to be passing a fingerprint now and the level of the fingerprint signal is kept "H".

On the other hand, if the answer to the query of step ST36 is YES, then the light beam is determined to have already passed the fingerprint, the level of the fingerprint signal is decreased to "L" in Step ST37 and then the process advances to Step S38.

A fingerprint can be detected by the apparatus and method that has been described in detail above.

Hereinafter, a method for alerting the user to a result of the fingerprint detection and a method for automatically cleaning the fingerprint will be described.

By reference to an address signal that has been provided by the demodulator 114 in the read circuit 110 by way of the error corrector 115, the fingerprint processing section 132 shown in FIG. 7 can find the start and end addresses of the fingerprint signal. And based on these addresses, the fingerprint processing section 132 can determine the size and radial location of the fingerprint that the light beam has passed. Once the size and location of the fingerprint have been determined, the information about the size and location of the fingerprint is conveyed to the host 140 by way of the I/F circuit 131. If the optical disc apparatus is a recorder or a player, the host 140 is a so-called "backend". On the other hand, if the optical disc apparatus is an optical disc drive, the host 140 is a PC connected to the drive with an ATAPI, for example.

On getting the information, the host 140 may put, on a TV monitor 141, the alert that reads:

"A fingerprint with Φ of 10 mm is left at a radial location of 35-40 mm on inside area of optical disc. As read/write operation may fail, please wipe it away or replace the discs"

If the optical disc apparatus is a player or a recorder, the host 140 may display an error code, corresponding to the alert, on the fluorescent tube of the front panel. Alternatively, the host 140 may put out such an alert as a voice message to the user. On receiving such a notification, the user can know how big the fingerprint on the optical disc is and where the fingerprint is located on the disc. Thus, the user can remove the fingerprint away appropriately by himself or herself.

An optical disc apparatus, including the fingerprint detecting means of the present invention (i.e., the fingerprint detecting section 308 and the fingerprint processing section 132) described above, can confirm that the defect in question must be a fingerprint and can also detect the exact size and radial location of that fingerprint. That is why by providing a cleaner (or wiping brush) for the optical disc apparatus, the cleaner can be positioned substantially accurately with respect to the fingerprint. As a result, the fingerprint can be wiped away automatically in a very short time.

Hereinafter, it will be described with reference to FIG. 7 in what procedure the cleaner wipes the fingerprint away according to this preferred embodiment.

Specifically, the fingerprint processing section 132 of the system controller 130 shown in FIG. 7 outputs a signal to a wiping brush 108 by way of the servo controller 106, the optical pickup 103 and the motor driver 102.

By reference to the address signal that has been provided by the demodulator 114 in the read circuit 110 by way of the error corrector 115, the fingerprint processing section 132 can find the start and end addresses of the fingerprint signal. As a result, the fingerprint processing section 132 can determine the size and the radial location of the fingerprint that the light beam has passed. Once the size and location of the fingerprint have been determined, the fingerprint processing section 132 provides the information about the fingerprint for the servo controller 106. In response, the servo controller 106 moves the optical pickup 103 and a traverse motor (not shown) that drives the optical pickup 103 in the radial direction. Thereafter, the servo controller 106 gets the wiping brush 108 turned reversely to the direction of rotation of the optical disc by the motor driver 102, thereby wiping away the fingerprint that has been left on the surface of the optical disc 100.

Even without turning the wiping brush 108 reversely, the same effect will be achieved just by letting the wiping brush 108 stick out toward the optical disc 100 and wipe the optical disc until the disc has turned a predetermined number of times (i.e., until a predetermined amount of time passes) because the optical disc is being turned by the optical disc motor 101. According to this method, the fingerprint can be wiped away in a much shorter time compared to a situation where the optical disc is supposed to be wiped away entirely.

As described above, a conventional optical disc apparatus cannot determine whether a defect detected on an optical disc is a fingerprint or something else such as a scratch or dust. That is why it has been proposed that if any defect has been found on an optical disc, the optical disc be cleaned entirely to remove the dust, if any, from the optical disc. In that case, however, the cleaner or brush should be designed so as to remove dust properly. Thus, it is difficult to remove a fingerprint sufficiently with such a cleaner or brush. Consequently, the conventional automatic cleaning technique cannot guarantee that a fingerprint can be removed properly.

However, according to the present invention, a fingerprint located and any other defect detected such as dust can be clearly distinguished from each other. That is why by providing a cleaner or brush, which is specially designed so as to remove a fingerprint perfectly, for the optical disc apparatus, a fingerprint, if detected any, can be removed by proper cleaning. In addition, according to a preferred embodiment of the present invention; the fingerprint can be located exactly and it can be determined whether or not the fingerprint has been removed perfectly. That is why only a portion of the disc spotted with a fingerprint can be wiped with a specially designed fingerprint cleaner over and over again until the fingerprint disappears completely. As a result, the fingerprint can be removed quickly.

Hereinafter, an improved fingerprint detecting method using the surface focus control technique for HD-DVDs and DVDs will be described.

As mentioned above, portion (a) of FIG. 5 is a schematic representation illustrating a situation where a light beam is focused on the surface of an optical disc. Portions (b), (c) and (d) show the reflected light intensities in three different situations where the light beam goes in the directions indicated by the arrows A, B and C, respectively.

In this example of the improved technique, if the optical disc loaded is an HD-DVD or a DVD, the fingerprint is detected with a focus control established on the surface of that optical disc using their associated light beam. In that case, the light beam spot formed on the optical disc surface is much smaller than the fingerprint dot pitch of 300 μm. That is why if the light beam spot 10 goes along the path indicated by the arrow A shown in FIG. 5, there will be no problem. However, if the light beam spot 10 went along the path indicated by the arrow B, then the light beam spot 10 would slip through the gap between the fingerprint dots, and therefore, the fingerprint that is present there could not be detected.

On top of that, there are no tracks (such as spiral grooves) on the surface of the optical disc. For that reason, when the light beam is focused on the surface of the optical disc, it is difficult to scan the surface for a fingerprint either spirally along the tracks or every several tracks with intervening ones skipped. What is more, since no tracking control can be performed on that surface, the relative location of the light beam spot 10 with respect to the fingerprint will change due to the influence of eccentricity of the optical disc. Consequently, every time the surface is scanned for any fingerprint, the pattern of the fingerprint detected will vary, thus possibly resulting in decreased accuracy of fingerprint detection, which is also a problem.

To overcome such a problem, according to this preferred embodiment, the light beam spot is moved in a wobbling (or zigzag) pattern as indicated by the arrow C shown in FIG. 5. Specifically, to do that, by applying a sine wave signal to the tracking actuator while searching for a fingerprint, the optical disc may be turned with the objective lens 201, 202 wobbled. Then, it is possible to prevent the light beam spot from slipping through the gap between the fingerprint dots, and therefore, the accuracy of fingerprint detection can be increased. The wobbling frequency may be set to be sufficiently higher than the number of fingerprint dots the light beam spot crosses per unit time. Also, the amplitude of wobble of the light beam spot on the optical disc may be adjusted to a magnitude that covers at least two fingerprint dots (e.g., approximately 600 μm or more). Then, even if the light beam needs to be focused on the optical disc surface, the fingerprint can be detected with both accuracy and stability.

Even if the optical disc loaded has been recognized to be an HD-DVD, it is still preferred that the fingerprint be detected using a DVD objective lens and a red laser beam. The reason will be described below.

An HD-DVD and a DVD use lenses, of which the NAs defined are not different so significantly from each other, and also require a substrate with the same material thickness of 0.6 mm. That is why it is difficult to distinguish an HD-DVD from a DVD. Furthermore, as shown in Table 1, the light beam spot formed on the surface of an HD-DVD has a size of 0.34 μm and the one formed on the surface of a DVD has a size of 0.65 μm. Compared to the size of fingerprint dots, these sizes are too small to make any difference between them. On top of that, since the influence of spherical aberration is proportional to the inverse number of the wavelength, a blue-violet laser beam for use with an HD-DVD would be affected by spherical aberration approximately 1.5 times as significantly as a one for use with a DVD and its focus signal would also be disturbed more easily.

That is why if the optical disc apparatus is designed such that even if the given optical disc is recognized to be an HD-DVD, the fingerprint is always detected using a DVD objective lens and a red laser beam, the fingerprint will be detected with the same degree of accuracy but the stability of focus control will rather increase. Also, even if a DVD has been taken for an HD-DVD by mistake, for example, the focus control and the tracking control can still be started without starting over the disc loading process all over again and the recovery can get done quickly after that. This is advantageous because the number of DVDs on the market is overwhelming compared to that of HD-DVDs.

Also, as already described with reference to FIGS. 8 and 9, according to this preferred embodiment, fingerprint detection and disc type recognition are carried out using an RF signal that has been generated from the all sum signal of the A, B, C and D areas of the quadruple detector 211 (i.e., totally reflected light intensity signal). However, if the reflected light is split using a polarization hologram, for example, and if the focus and tracking signals are detected with two different detectors, then a sum signal may be generated by only of those two detectors for either the focusing system or the tracking system, and then the fingerprint detection and disc type recognition may be carried out in a similar manner using that signal.

Embodiment 2

In a hybrid optical disc, information about the presence of a DVD information layer behind a BD layer is stored on the BD information layer. For that reason, unless the light beam is focused on the BD information layer to begin with, nobody knows whether there is a DVD information layer behind the BD information layer or not. If the optical disc apparatus tried to get a focus control established on a DVD information layer when it is still not certain whether the given optical disc is a hybrid one or not and if there was no DVD information layer after all, the lens would collide against the optical disc.

The optical disc apparatus of this preferred embodiment has the same configuration as the counterpart of the first preferred embodiment described above. But the apparatus of this preferred embodiment operates differently from the counterpart of the first preferred embodiment. Specifically, first of all, after getting a focus control established on a BD information layer using a light beam for use with BDs, the optical disc apparatus determines whether the given optical disc is a hybrid one or not. Next, the optical disc apparatus starts fingerprint detection irrespective of the result of the decision. Then, the apparatus can change to the fingerprint detection mode quickly without turning the focus control OFF and then ON again. That is why compared to a situation where the apparatus tries to detect a fingerprint with a light beam for use with DVDs focused on the surface of the optical disc again, the fingerprint can be detected more quickly and with more stability.

It should be noted that if the given optical disc has turned out to be a normal BD disc, not a hybrid optical disc, after the focus control has gotten established on the BD information layer, then the optical disc apparatus performs the fingerprint detection with the focus control locked on the BD information layer.

Embodiment 3

The optical disc apparatus of this preferred embodiment includes a defect detecting section for detecting both a fingerprint and any other kinds of defect as well, which is obtained by modifying the fingerprint detecting section of the first preferred embodiment (see FIG. 9). But other than that, the optical disc apparatus of this preferred embodiment has the same configuration as the counterpart of the first preferred embodiment described above.

Figure 13:
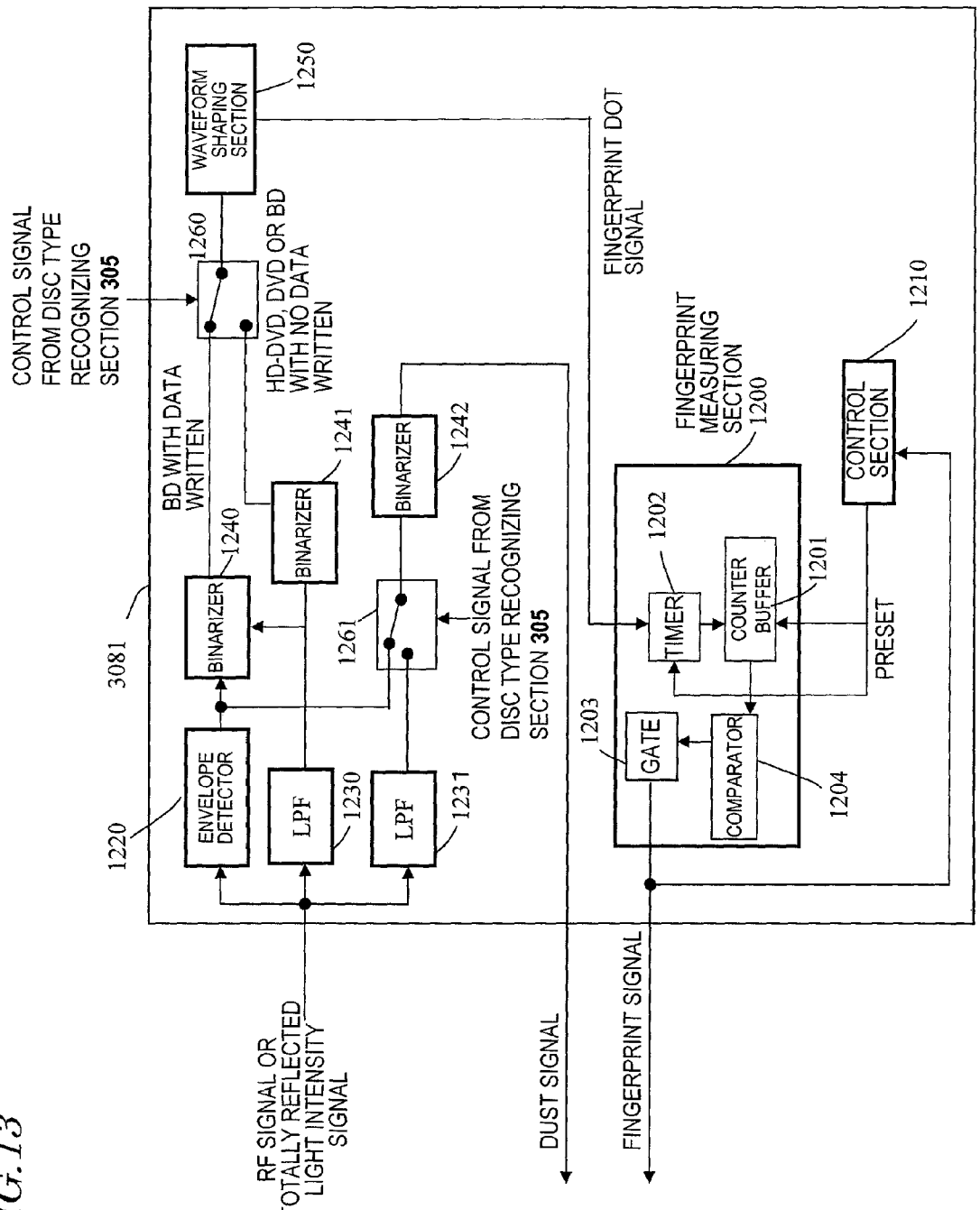
FIG. 13 is a block diagram illustrating a configuration for a defect detecting section, which is an expansion of the fingerprint detecting section shown in FIG. 9.

According to this preferred embodiment, while the focus control section 301 is trying to get focus control established on the surface of a DVD or an HD-DVD using a light beam for use with a DVD or a BD, the defect detecting section 3081 shown in FIG. 13 detects a fingerprint and any other kind of defect (such as dust) on the DVD or the HD-DVD. On the other hand, while the focus control section 301 is trying to get focus control established on a BD disc information layer using a light beam for use with a BD, the defect detecting section 3081 shown in FIG. 13 detects a fingerprint and any other kind of defect (such as dust) on the BD disc.

FIG. 13 is a block diagram illustrating a configuration for a defect detecting section, which is an expansion of the fingerprint detecting section shown in FIG. 9. In FIG. 13, a path for detecting a dust signal is added to the fingerprint detecting section shown in FIG. 9. On the other hand, FIG. 14 illustrates the outputs of a reflected light intensity signal, a fingerprint detection signal and a dust signal that are obtained in a situation where there are a fingerprint and dust side by side in the light beam scanning direction.

Hereinafter, it will be described how the optical disc apparatus of this preferred embodiment operates. The following description will be focused on the dust signal detecting path, which is added to the fingerprint detecting section shown in FIG. 9.

The RF signal or the totally reflected light intensity signal, which is the output of the adder 226 in the RF servo amplifier 104 shown in FIG. 7, is branched and input separately to the envelope detector 1220 and the LPFs 1230 and 1231 in the defect and fingerprint detector 3081. The output of the LPF 131 is supplied to a binarizer 1242.

Figure 14:
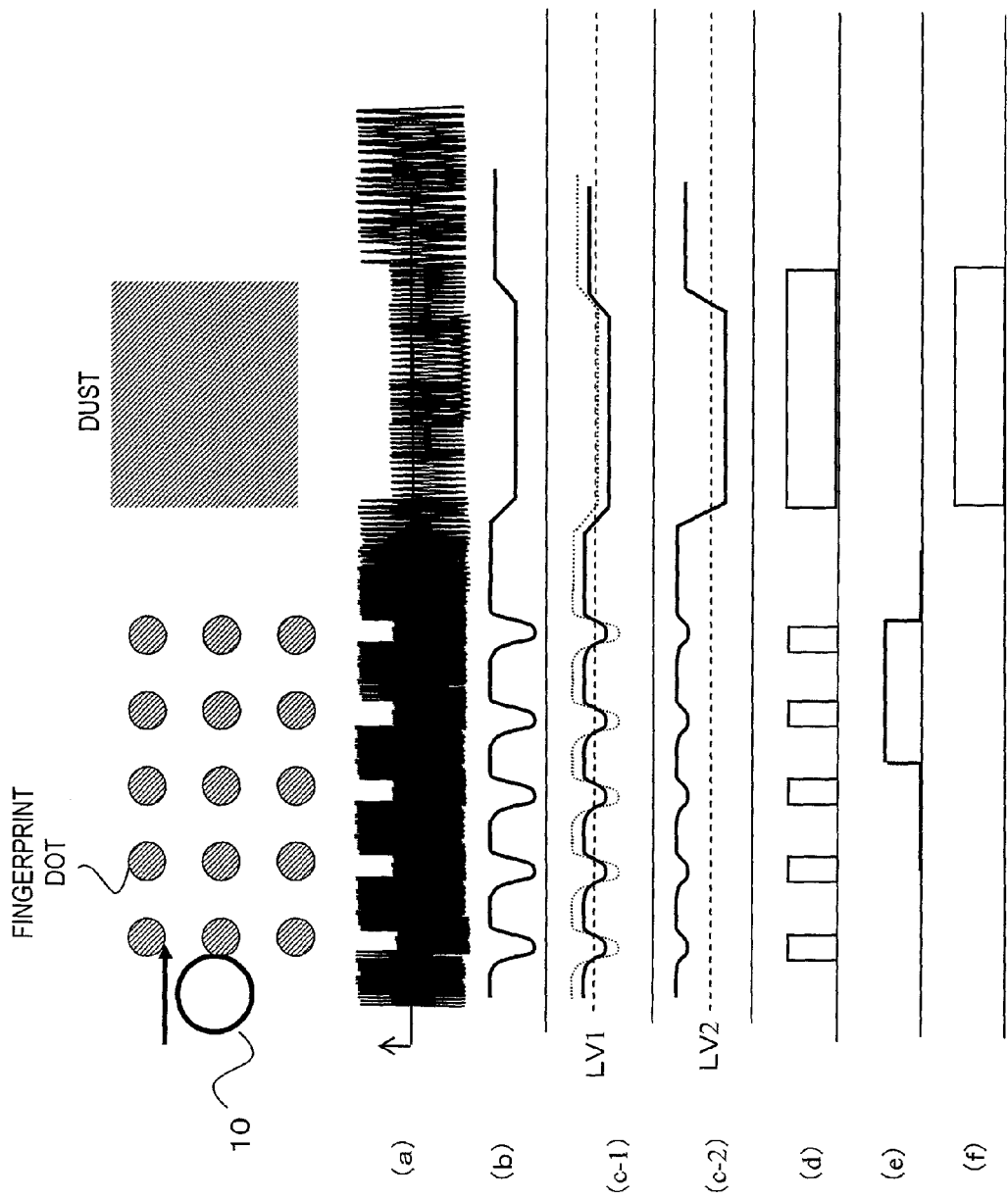
FIG. 14 shows the outputs of an RF signal or a reflected light intensity signal, a fingerprint detection signal, and a dust signal in a situation where there are a fingerprint and any other kind of defect (such as dust) side by side in the direction in which a scanning light beam is moving.

Portions (c-1) and (c-2) of FIG. 14 show the outputs of the LPFs 1230 and 1231, respectively. As shown in portion (c-2)

of FIG. 14, the LPF 1231 has its operating frequency range (i.e., its cutoff frequency) defined to be lower than that of the LPF 1230 provided for detecting a fingerprint. That is why the LPF 1231 passes a signal, of which the level changes gently with a slight decrease in amplitude over a broad range (i.e., as when dust is encountered).

The selector switch 1261 shown in FIG. 13 receives a control signal from the disc type recognizing section 305. If the optical disc loaded has turned out to be BD and if data has been written on the BD, the contact of the switch is turned to upside in accordance with a control signal. On the other hand, if the optical disc loaded is a BD on which no user data has been written yet or if the optical disc loaded has turned out to be an HD-DVD or a DVD, then no RF signal can be obtained and therefore the contact of the switch is turned to downside.

The signal that has passed through the LPF 1231 or the output of the envelope detector 1220 is binarized by the binarizer 1242 at a slice level LV2, which is defined to be lower than the slice level LV1. As a result, dust can be detected separately from a fingerprint. Once the dust and the fingerprint are detected, the user is notified of that by way of the fingerprint processing section 132, the I/F circuit 131 and the host 140 or the dust and the fingerprint are removed by automatic cleaning.

As described above, according to this preferred embodiment, if there are a fingerprint and any other kind of defect such as dust on the line along which the spot of the scanning light beam is moving, the fingerprint and the non-fingerprint defect can be detected separately from each other. That is why if a dedicated output port and an internal register are provided, the best type of processing can always be done adaptively according to the situation. Specifically, if any non-fingerprint defect has been detected, the servo operation may get on hold. On the other hand, if dust or a fingerprint has been detected, then the user may be notified that it has been wiped away.

In the foregoing description of the first through third preferred embodiments of the present invention, the fingerprint is supposed to be detected using only pieces of hardware including a timer and a counter. However, if a high speed processing processor such as a high speed DSP that has as high a processing rate as to realize a digital servo operation, the fingerprint detection process described above can also get done using software.

Optionally, the present invention is also applicable for use in even an optical disc apparatus that uses a laser light source to emit a light beam with a single wavelength, e.g., an optical disc apparatus for performing read and/or write operation(s) on only a particular type of optical discs such as CDs, DVDs or BDs.

INDUSTRIAL APPLICABILITY

An optical disc apparatus according to the present invention can get fingerprint detection and read/write operation done accurately and appropriately on not only BDs and HD-DVDs but also conventional DVDs as well, and therefore, can be used effectively in all of BDs, HD-DVDs and any other next-generation optical discs to be developed in the near future.

The invention claimed is:

1. An optical disc apparatus comprising:
a laser light source for emitting a light beam;
an optical system for converging the light beam on an optical disc that has a surface and at least one information storage layer;
a focus control section for controlling the focus position of the light beam with respect to the optical disc; and
a defect detecting section, which senses light reflected from the surface of the optical disc with the focus position of the light beam set on the surface, thereby determining, based on the intensity of the reflected light, whether or not there is a fingerprint on the optical disc,
wherein the defect detecting section detects the fingerprint when the intensity of the reflected light has dropped a number of times due to multiple dots that form the fingerprint, each drop in intensity of the reflected light corresponding to each of the multiple dots that form the fingerprint.

2. The optical disc apparatus of claim 1, wherein the laser light source emits multiple light beams, of which the wavelengths are different from each other and include a first wavelength and a second wavelength that is longer than the first wavelength, and
wherein the optical system converges an arbitrarily selected one of the multiple light beams onto the optical disc.

3. The optical disc apparatus of claim 2, wherein the laser light source emits the light beam with the first wavelength when data is going to be read from, or written on, a disc having a blu-ray format, but emits the light beam with the second wavelength when data is going to be read from, or written on, a non blu-ray format optical disc.

4. The optical disc apparatus of claim 2, comprising disc type recognizing means for determining whether the optical disc loaded is a disc having a blu-ray format or a non blu-ray format optical disc,
wherein if the disc type recognizing means has recognized the optical disc loaded to be a disc having a blu-ray format, the defect detecting section senses the light that has been reflected from the information storage layer of the optical disc with the focus position of the light beam set on the information storage layer of the optical disc, and determines, based on the intensity of the reflected light, whether or not there is a fingerprint on the optical disc.

5. The optical disc apparatus of claim 4, wherein when the disc type recognizing means is going to recognize the type of the optical disc loaded, the light source emits the light beam with the first wavelength earlier than any other one of the light beams, and
the disc type recognizing means determines, based on the reflected light of the light beam with the first wavelength, whether the optical disc loaded is a disc having a blu-ray format or a non blu-ray format optical disc.

6. The optical disc apparatus of claim 5, wherein if the optical disc loaded has been recognized to be a non blu-ray format optical disc, the light source emits the light beam with the second wavelength among the multiple light beams, the focus control section sets the focus position of the light beam with the second wavelength on the surface of optical disc, and
the defect detecting section senses the light that has been reflected from the surface of the optical disc with the focus position of the light beam set on the surface of the optical disc, and determines, based on the intensity of the reflected light, whether or not there is a fingerprint on the optical disc.

7. The optical disc apparatus of claim 3, wherein while the defect detecting section is detecting a fingerprint, the laser light source emits the light beam with the second wavelength and the focus control section sets the focus position of the light beam with the second wavelength on the surface of the optical disc.

8. The optical disc apparatus of claim 3, wherein the optical system includes an objective lens for discs having a blu-ray format and another objective lens having a smaller numerical aperture NA than the objective lens for discs having a blu-ray format, and wherein in setting the focus position of the light beam with the second wavelength on the surface of the optical disc, the focus control section uses a light beam that has passed through the objective lens having the smaller numerical aperture NA than the objective lens for discs having a blu-ray format.

9. The optical disc apparatus of claim 1, wherein the defect detecting section determines, based on the intensity of the reflected light, whether the defect on the optical disc is a fingerprint or any other kind of defect.

10. The optical disc apparatus of claim 1, further comprising a fingerprint wiping mechanism, wherein if the defect detecting section has decided that there should be a fingerprint on the optical disc, the fingerprint wiping mechanism wipes the fingerprint away.

* * * * *